United States Patent
Choi et al.

(10) Patent No.: US 12,486,454 B2
(45) Date of Patent: Dec. 2, 2025

(54) ZINC OXIDE-POLYCYCLIC AROMATIC HYDROCARBON QUANTUM DOT CAPABLE OF BLUE LIGHT EMISSION AND MANUFACTURING METHOD THEREOF

(71) Applicant: KOREA INSTITUTE OF SCIENCE AND TECHNOLOGY, Seoul (KR)

(72) Inventors: Won-Kook Choi, Seoul (KR); Hong Hee Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 634 days.

(21) Appl. No.: 17/970,908

(22) Filed: Oct. 21, 2022

(65) Prior Publication Data
US 2023/0126798 A1 Apr. 27, 2023

(30) Foreign Application Priority Data
Oct. 22, 2021 (KR) .................. 10-2021-0142103

(51) Int. Cl.
*C09K 11/08* (2006.01)
*C09K 11/06* (2006.01)

(52) U.S. Cl.
CPC .......... *C09K 11/0811* (2013.01); *C09K 11/06* (2013.01); *C09K 2211/1003* (2013.01); *C09K 2211/1007* (2013.01); *C09K 2211/1416* (2013.01); *C09K 2211/1425* (2013.01)

(58) Field of Classification Search
CPC ............... C09K 11/0811; C09K 11/06; C09K 2211/1003; C09K 2211/1007; C09K 2211/1416; C09K 2211/1425
See application file for complete search history.

(56) References Cited

FOREIGN PATENT DOCUMENTS

| KR | 10-2009-0093638 A | 9/2009 |
|---|---|---|
| KR | 10-2013-0038428 A | 4/2013 |
| KR | 10-2015-0115318 A | 10/2015 |
| KR | 10-1695442 B1 | 1/2017 |
| KR | 10-2019-0107336 A | 9/2019 |
| KR | 10-2072438 B1 | 2/2020 |

OTHER PUBLICATIONS

Qian, Lei, et al. "Stable and efficient quantum-dot light-emitting diodes based on solution-processed multilayer structures." Nature photonics 5.9 (2011): 543-548.

(Continued)

*Primary Examiner* — C Melissa Koslow
(74) *Attorney, Agent, or Firm* — NSIP Law

(57) ABSTRACT

Disclosed are a zinc oxide-polycyclic aromatic hydrocarbon quantum dot capable of blue light emission in which ZnO is combined with a polycyclic aromatic hydrocarbon having a blue light emitting characteristic to realize a quantum dot of a core-shell structure and electron emission transition is induced to proceed within the polycyclic aromatic hydrocarbon so that the purity of blue light emission is improved, and a manufacturing method thereof. The zinc oxide-polycyclic aromatic hydrocarbon quantum dot capable of blue light emission includes a core-shell structure of zinc oxide-polycyclic aromatic hydrocarbon (ZnO-PAH) quantum dot in which the ZnO quantum dot and the PAH are combined, the ZnO-PAH quantum dot includes an energy level in a form of a Type II structure or a quasi-Type II structure.

7 Claims, 24 Drawing Sheets

(56) References Cited

OTHER PUBLICATIONS

Kim, Hong Hee, et al. "Realization of excitation wavelength independent blue emission of ZnO quantum dots with intrinsic defects." ACS Photonics 7.3 (2020): 723-734.
Kim, Taehyung, et al. "Efficient and stable blue quantum dot light-emitting diode." Nature 586.7829 (2020): (17 pages in English).
Son, Dong Ick, et al. "Emissive ZnO-graphene quantum dots for white-light-emitting diodes." Nature nanotechnology 7.7 (2012): 465-471.
Kim, Hong Hee, et al. "Inverted quantum dot light emitting diodes using polyethylenimine ethoxylated modified ZnO." Scientific reports 5.1 (2015): 1-5.
Park, Joong Pill, Jae-Joon Lee, and Sang-Wook Kim. "Highly luminescent InP/GaP/ZnS QDs emitting in the entire color range via a heating up process." Scientific reports 6.1 (2016): 1-6.
Yang, Yixing, et al. "High-efficiency light-emitting devices based on quantum dots with tailored nanostructures." Nature Photonics 9.4 (2015): 259-266.
Kwak, Jeonghun, et al. "Bright and efficient full-color colloidal quantum dot light-emitting diodes using an inverted device structure." Nano letters 12.5 (2012): 2362-2366.
Lee, Ki-Heon, et al. "Highly efficient, color-pure, color-stable blue quantum dot light-emitting devices." ACS nano 7.8 (2013): 7295-7302.

5-Amino-Naphthalenesulfonic acid (ANSA)

1-Amino-Pyrene

ZINC OXIDE-POLYCYCLIC AROMATIC HYDROCARBON QUANTUM DOT CAPABLE OF BLUE LIGHT EMISSION AND MANUFACTURING METHOD THEREOF

DESCRIPTION OF GOVERNMENT-SUPPORTED RESEARCH AND DEVELOPMENT

This research was conducted at the Korea Research Institute of Science and Technology under the management of the National Research Foundation under the Ministry of Science and ICT. The research project name is basic research in science & engineering academic research, and the research project title is a synthesis of a new complex quantum dot through the combined zinc oxide-polycyclic aromatic hydrocarbon, identification of a light emitting mechanism, and development of a blue light emitting diode using the same (Project identification number: 1345341636).

CROSS REFERENCE TO RELATED APPLICATION

The present application claims priority to Korean Patent Application No. 10-2021-0142103, filed Oct. 22, 2021, the entire contents of which are incorporated herein by reference.

BACKGROUND OF THE INVENTION

Field of the Invention

The present invention relates to a zinc oxide-polycyclic aromatic hydrocarbon quantum dot capable of blue light emission and a manufacturing method thereof, and more particularly, to a zinc oxide-polycyclic aromatic hydrocarbon quantum dot capable of blue light emission in which ZnO is combined with a polycyclic aromatic hydrocarbon having a blue light emitting characteristic to realize a quantum dot of a core-shell structure and electron emission transition is induced to proceed within the polycyclic aromatic hydrocarbon so that the purity of blue light emission is improved, and a manufacturing method thereof.

Description of the Related Art

Recently, research for applying quantum dots, which are defined as semiconductor nanoparticles having a size of 10 nm or less and consisting of 10 to 100 atoms, as a phosphor of a light emitting diode, is being actively conducted. The bandgap ($E_g$) of the quantum dot increases in inverse proportion to the size (d) of the quantum dot and becomes wider due to the quantum confinement effect when the Bohr radius is smaller than the size of the quantum dot, and is characterized by having a well-defined electronic level between atoms, molecules, and bulk.

Quantum dots with these characteristics have a light emission characteristic with excellent purity showing very small spreadability with a full-width at half maximum (FWHM) of several tens of m eV or less when emitting light through photoexcitation, a color rendering index (CRI) of 90% or more, color gamut, excellent photoelectric material properties with luminous efficiency of 70% or more. Thus, research is underway to apply quantum dots to light emitting diodes, light absorption diodes, electron transport layers, bio-imaging, electrodes for photoelectrochemical cell, solar cells, and the like.

Quantum dots are classified into binary and ternary compounds according to their constituents, and in detail, quantum dots are classified as II-VI groups: CdTe, CdSe, CdS, II-V groups: InP, InAs, I-III-VI groups: $CuInS_2$, $AgInS_2$, IV-VI groups: PbSe, PbS. Among them, until now, it is known that the efficiency of CdSe, PbS, etc., which are quantum dots of S, Se chalcogenide compounds such as Cd and Pb of II and IV groups, is the highest. For example, the infrared-visible light region of 0.8 eV to 2.6 eV is realized by controlling the size of core-shell structured quantum dots such as PbS/CdSe to CdSe/ZnS.

However, CdSe material is classified as a hazardous material by the European Union (EU), etc., so it is not suitable for manufacturing an optoelectronic device with this material. Also, the use of a toxic material such as Pb is strictly regulated. Recently, as a new quantum dot material to overcome this problem, research on In-based compounds such as InP and $CuInS_2$ is being actively conducted. However, the cost of In is also very high due to limited reserves and a monopolistic supply from China, etc., and there is a problem due to monopolization of market price, and In-based compounds have a relatively low quantum efficiency compared to Cd and Pb-based compounds.

Recently, Te-doped ZnTeSe blue light-emitting quantum dots have been reported. Although Te has low toxicity, there is also a fundamental problem to be solved in the use of Te. Recently, there is a perovskite material (e.g., $MAPbX_3$), which has been attracting a lot of attention due to its very small FWHM in the emission curve and very high quantum yield (up to 92%). However, it is necessary to solve the fundamental problems of safety against air and moisture and Pb toxicity.

On the other hand, among II-VI semiconductor materials with wide bandgap of direct-gap transition ($E_g$>3.3 eV, room temperature), ZnO not only exists in a very large amount in nature, but is also attracting attention as a non-Cd and non-In based material as an eco-friendly material. However, when the ZnO oxide semiconductor is manufactured as a nano-structured quantum dot, except when manufactured as a single crystal or stacked thin film with excellent crystallinity, oxygen vacancy ($V_O$) due to lack of oxygen or intrinsic defects such as interstitial Zn atoms ($Zn_i$) are likely to be included. The energy level of these intrinsic defect exists within a bandgap defined by the difference between a conduction band (CB) and a valence band (VB). When these intrinsic defects exist, electrons present in the valence band gain energy by external photo or electrical excitation and are transited to the conduction band, which is a high energy level. Rather than losing energy to return to a stable original state and directly transitioning to the valence band (see FIG. 1A) to generate near-ultraviolet rays with a wavelength of about 375 nm (=3.3 eV) corresponding to the bandgap, the excited electrons move to a binding energy level near below the conduction band, as indicated by the dotted line in FIG. 1B, and light emission mainly occurs due to the transition to the defect energy level of lower energy in the bandgap, or the valence band. In this way, the wavelengths in the visible light region having a lower energy than the bandgap energy, that is, a long wavelength are mostly obtained. Visible light such as green light emission, yellow light emission, and blue light emission is observed and the intensity is determined, depending on the type and concentration of the intrinsic defect.

As such, ZnO quantum dot has a characteristic that it is difficult to emit light of a specific single color due to intrinsic defects. Regarding the problems of ZnO quantum dot, the present applicant proposed a core-shell structure in which graphene oxide is bonded to ZnO through Korean Patent Registration No. 2072438 in which quantum dot capable of ultimately emitting blue light was realized by suppressing yellow light emission by allowing the oxygen vacancy defect of ZnO to quench by the combination of ZnO and graphene oxide.

On the other hand, the blue light emission of ZnO quantum dot can be realized through the technology disclosed in Korean Patent Registration No. 2072438, but since only oxygen vacancy defect of ZnO is quenched, there is still a phenomenon in which a color other than blue is emitted due to the electron transition to the energy level of another defect.

SUMMARY OF THE INVENTION

The present invention has been devised to solve the above problems, and an object of the present invention is to provide a zinc oxide-polycyclic aromatic hydrocarbon quantum dot capable of blue light emission in which ZnO is combined with a polycyclic aromatic hydrocarbon having a blue light emitting characteristic to realize a quantum dot of a core-shell structure and electron emission transition is induced to proceed within the polycyclic aromatic hydrocarbon so that the purity of blue light emission is improved, and a manufacturing method thereof.

In order to achieve the above object, a zinc oxide-polycyclic aromatic hydrocarbon quantum dot which is capable of blue light emission, according to the present invention, includes a core-shell structure of zinc oxide (ZnO)-polycyclic aromatic hydrocarbon (PAH) quantum dot in which the ZnO quantum dot and the PAH are combined, wherein the ZnO-PAH quantum dot includes an energy level in a form of a Type II structure or a quasi-Type II structure.

In the Type II structure, a lowest unoccupied molecular orbital (LUMO) of the PAH has an energy level lower than the energy level of a conduction band (CB) of the ZnO, and a highest occupied molecular orbital (HOMO) of the PAH has the energy level lower than the energy level of a valence band (VB) of the ZnO. In the quasi-Type II structure, the LUMO of the PAH has the energy level higher than the energy level of the CB of the ZnO, and the HOMO of the PAH has the energy level higher than the energy level of the VB of the ZnO.

The PAH is a polycyclic aromatic hydrocarbon capable of emitting blue light, and the PAH has an energy bandgap ($E_g$) between a lowest unoccupied molecular orbital (LUMO) and a highest occupied molecular orbital (HOMO) of 2.5 eV or more.

The PAH is a polycyclic aromatic hydrocarbon in which benzene rings are linearly or non-linearly connected.

When n is referred as a number of the linearly connected benzene rings, the PAH is any one of benzene in case of n=1, naphthalene in case of n=2, anthracene in case of n=3, tetracene, naphthacene in case of n=4, and pentacene in case of n=5, or when n is referred as a number of the non-linearly connected benzene rings, the PAH is any one of pentalene, as-indacene, s-indacene in case of n=2, biphenylene, acenaphthylene, fluorene, fluoranthracene, phenanthrene, phenalene in case of n=3, pyrene, acephenanthrylene, fluoranthene, aceanthrylene, triphenylene, benzanthracene, chrysene in case of n=4, dibenz(a,h)anthracene, picene, perylene, benzo(e)pyrene in case of n=5, corannulene in case of n=6, coronene in case of n=7, and ovalene in case of n=10.

The PAH has a functional group, and the ZnO quantum dot and the PAH are bonded through the functional group. The functional group is a function group having any one or more of O, N, P, S, and Se.

A photo-excited electron transports from the ZnO quantum dot to the PAH when the quantum dot is irradiated with light, and electron transition occurs in the PAH to express the blue light emission.

A manufacturing method of a zinc oxide-polycyclic aromatic hydrocarbon quantum dot capable of blue light emission, according to the present invention, includes the steps of preparing a first solution in which a polycyclic aromatic hydrocarbon is dispersed and a second solution in which ZnO quantum dot is dispersed; and mixing the first solution and the second solution to prepare ZnO-PAH quantum dot having a core-shell structure in which the ZnO quantum dot and the polycyclic aromatic hydrocarbon are combined. The polycyclic aromatic hydrocarbon is a polycyclic aromatic hydrocarbon in which benzene rings are linearly or non-linearly connected.

The zinc oxide-polycyclic aromatic hydrocarbon quantum dot capable of blue light emission and the manufacturing method thereof according to the present invention have the following effects.

As the ZnO and the polycyclic aromatic hydrocarbon are combined in the Type II structure or the quasi-Type II structure, blue light emission is expressed through the polycyclic aromatic hydrocarbon other than the ZnO, so that the purity of blue light emission can be improved.

DETAILED DESCRIPTION OF THE INVENTION

Figure 1A:
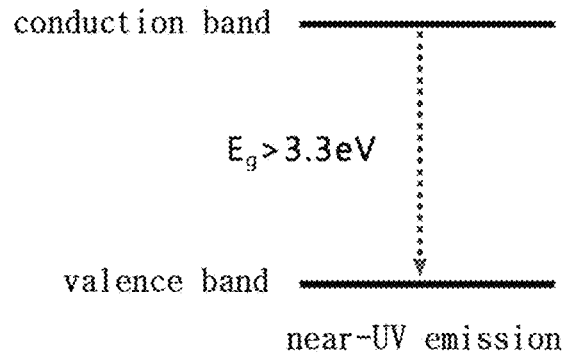
FIGS. 1A and 1B are reference views for describing the light emitting characteristics of ZnO quantum dot by electron transition.
Figure 1B:
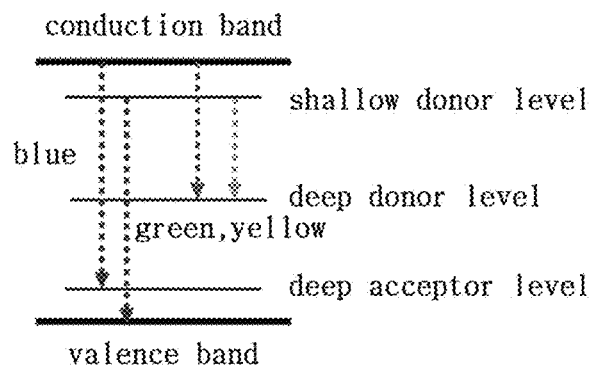

The present invention proposes a technology related to quantum dot in which zinc oxide (ZnO) and polycyclic aromatic hydrocarbon (PAH) are combined in a core-shell structure. ZnO corresponds to a core and polycyclic aromatic hydrocarbon corresponds to a shell. In the following description, zinc oxide will be referred to as ZnO, and polycyclic aromatic hydrocarbon will be referred to as PAH.

Quantum dot in which ZnO and PAH are combined in a core-shell structure, that is, the ZnO-PAH quantum dot according to the present invention has a blue light emission characteristic. The blue light emission characteristic of ZnO-PAH quantum dot is due to a Type II structure (or quasi-Type II structure) of the quantum dot and the blue light emission characteristic of PAH.

The polycyclic aromatic hydrocarbon, that is, PAH, has a characteristic of emitting different colors according to the value of the energy bandgap ($E_g$), which is the energy difference between a lowest unoccupied molecular orbital (LUMO) and a highest occupied molecular orbital (HOMO). For example, the PAH having an energy bandgap ($E_g$) of 2.5 eV or more has a blue light emission characteristic. Accordingly, in the present invention, the 'PAH which has an energy bandgap ($E_g$) of 2.5 eV or more' and has a blue light emission characteristic is applied as the PAH to be bonded to ZnO.

In addition, the ZnO-PAH quantum dot according to the present invention has a type II quantum dot structure. The structure of quantum dot is divided into a Type I structure and a Type II structure according to the energy level shape of the core and shell. The Type I structure is a structure in which the energy level (CB, VB) of the core is positioned within the energy level (LUMO, HOMO) of the shell, and the Type II structure is a structure in which the energy level of the core and the energy level of the shell are staggered.

More specifically, in the Type I structure, the conduction band (CB) of the core has a lower energy level than the energy level of LUMO of the shell, and the valence band (VB) of the core has a higher energy level than the energy level of the HOMO of the shell. In the case of Type II structure, the conduction band (CB) of the core has a higher energy level than the energy level of the LUMO of the shell, and the valence band (VB) of the core also has a higher energy level than the energy level of the HOMO of the shell.

As a modified structure of Type II, there is a quasi-Type II structure. The quasi-Type II structure has a structure in which the conduction band (CB) of the core has a lower energy level than the energy level of the LUMO of the shell, and the valence band (VB) of the core has also a lower energy level than the energy level of the HOMO of the shell.

In the case of the Type I structure, since the energy bandgap of the shell is larger than the energy bandgap of the core, electrons and holes are confined in the core. In the Type II structure (or quasi-Type II structure), electrons transport to the shell due to the staggered energy level shape.

Figure 2A:
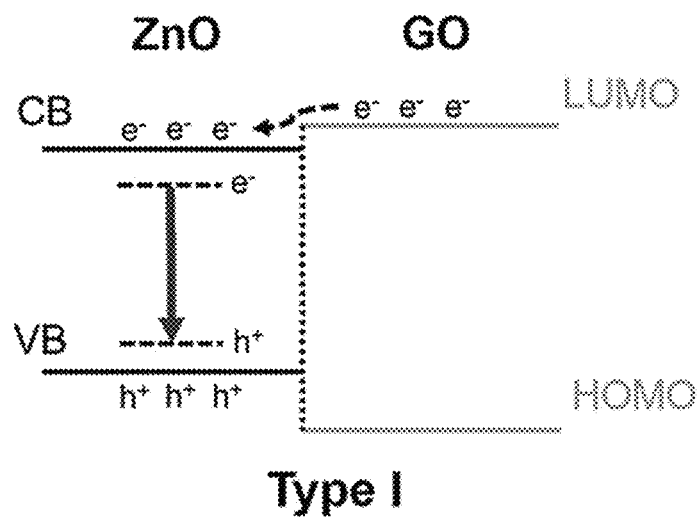
FIGS. 2A and 2B are reference views for describing the electron transition in a Type I structure and a Type II structure.

As an example of the Type I quantum dot structure, there is Korea Patent Registration No. 2072438, which is a registered patent of the present applicant. In Korean Patent Registration No. 2072438, the conduction band (CB) of ZnO has a lower energy level than the energy level of the LUMO of graphene oxide (GO), and the valence band (VB) of ZnO has a higher energy level than the energy level of the HOMO of graphene oxide (GO) (see FIG. 2A). As the ZnO-GO quantum dot of Korea Patent Registration No. 2072438 form the Type I structure, electron transition occurs in ZnO, which is the core, and thus blue light emission occurs. On the other hand, electron transition does not occur in graphene oxide (GO), which is the shell.

Figure 2B:
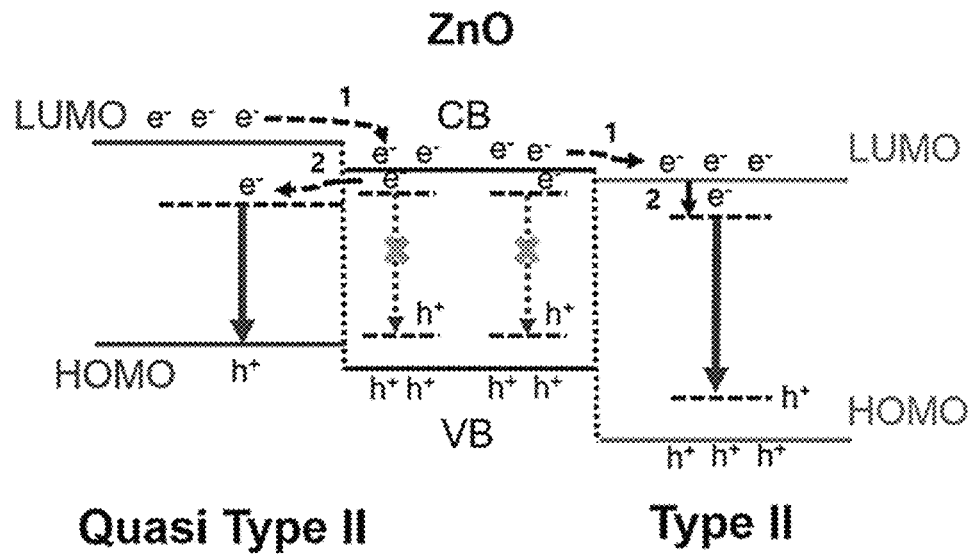

Unlike the ZnO-GO quantum dot of Korean Patent Registration No. 2072438, the ZnO-PAH quantum dot according to the present invention forms the Type II structure (or quasi-Type II structure), and accordingly, no electron transition occurs in the ZnO, which is the core, and electron transition occurs in the PAH, which is the shell (see FIG. 2B).

As mentioned above, the PAH applied to the present invention is the 'PAH which has an energy bandgap ($E_g$) of 2.5 eV or more' and has a blue light emission characteristic, and the electron transition occurs in the shell (PAH), rather than the core, due to the Type II structure (or quasi-Type II structure). Thus, since the PAH has blue light emission characteristic due to the electron transition, the ZnO-PAH quantum dot according to the present invention can express blue light emission due to the Type II structure (or quasi-Type II structure) and the 'PAH having the energy bandgap ($E_g$) of 2.5 eV or more'.

The ZnO-PAH quantum dot according to the present invention has the Type II structure (or quasi-Type II structure) so that the electron transition occurs in the PAH and blue light emission is expressed. Accordingly, it is possible to improve the purity of blue light emission compared to the Type I structure of the ZnO-GO quantum dot in which the blue light emission occurs in ZnO. In the case of ZnO-GO quantum dot, even if blue-based emission is induced by suppressing yellow light emission in ZnO, it cannot be prevented from emitting colors other than blue. On the other hand, the ZnO-PAH quantum dot according to the present invention applies the PAH having the blue light emission characteristic, so that the purity of blue light emission is obviously improved.

On the other hand, the PAH applied to the present invention must have LUMO and HOMO characteristics to satisfy the Type II structure (or quasi-Type II structure) in addition to the condition of the PAH having the energy bandgap ($E_g$) of 2.5 eV or more as described above. That is, in order to satisfy the Type II structure, the energy levels of the LUMO and HOMO of PAH must be lower than the energy levels of the conduction band (CB) and valence band (VB) of ZnO, respectively. In addition, in order to satisfy the quasi-Type II structure, the energy levels of LUMO and HOMO of the PAH must be higher than the energy levels of the conduction band (CB) and valence band (VB) of ZnO, respectively. Here, it is known that the energy bandgap of ZnO is about 3.4 eV, the conduction band (CB) of ZnO is about-3.35 eV and the valence band (VB) of ZnO is about −6.75 eV, based on the vacuum energy level ($E_{vac}$=0 eV).

The PAH satisfying the Type II structure (or quasi-Type II structure) is limited to the polycyclic aromatic hydrocarbon in which benzene rings are linearly connected or the polycyclic aromatic hydrocarbon in which benzene rings are non-linearly connected.

When the number of benzene rings is referred to as n, the polycyclic aromatic hydrocarbon in which benzene rings are linearly connected may be any one of benzene in case of n=1, naphthalene in case of n=2, anthracene in case of n=3, tetracene, naphthacene in case of n=4, and pentacene in case of n=5.

In addition, when the number of benzene rings is referred to as n, the polycyclic aromatic hydrocarbon in which benzene rings are non-linearly connected may be any one of pentalene, as-indacene, s-indacene in case of n=2, biphenylene, acenaphthylene, fluorene, fluoranthracene, phenanthrene, phenalene in case of n=3, pyrene, acephenanthrylene, fluoranthene, aceanthrylene, triphenylene, benzanthracene, chrysene in case of n=4, dibenz(a,h)anthracene, picene, perylene, benzo(e)pyrene in case of n=5, corannulene in case of n=6, coronene in case of n=7, and ovalene in case of n=10.

In the experimental examples described below, the naphthalene having n=2 as an example of the polycyclic aromatic hydrocarbon in which the benzene rings are linearly connected, and the phyline having n=4 as an example of the polycyclic aromatic hydrocarbon in which the benzene rings are nonlinearly connected were applied.

Figure 3A:
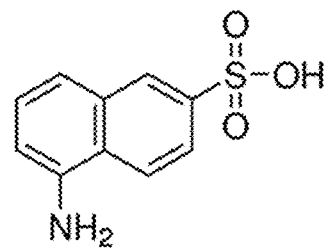
FIGS. 3A and 3B show the chemical structural formulas of 5-Amino-2-naphthalene sulfonic acid (ANSA) and 1-Amino-Pyrene, respectively.
Figure 3B:
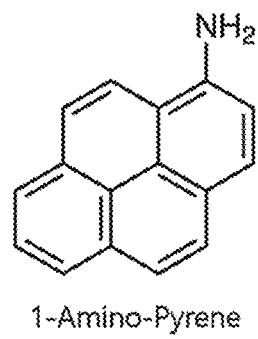

Meanwhile, in the ZnO-PAH quantum dot according to the present invention, the PAH is bonded to the ZnO, which is a core, in the form of a shell. Thus, the PAH must be provided with a functional group for the physicochemical bonding of the ZnO and the PAH. For example, a functional group such as an amino group ($NH_2$) and a sulfuric acid group $((S=O)_2-OH)$ is provided in the PAH, and ZnO and PAH are bonded through this functional group. When the functional group is defined in terms of elements, the functional group may be limited to a functional group including any one or more of O, N, P, S, and Se. In an experimental example to be described later, as the PAH provided with the functional group, in the case of linearity, 5-Amino-2-naphthalenesulfonic acid ($H_2NC_{10}H_6SO_3H$, ANSA) (see FIG. 3A) in which an amino group ($NH_2$) and a sulfuric acid group $((S=O)_2-OH)$ are provided in naphthalene having n=2 is exemplified. In the case of non-linearity, 1-Amino-Pyrene (see FIG. 3B) in which an amino group ($NH_2$) is provided in pyrene having n=4 is exemplified.

In the above, it has been described with respect to the zinc oxide-polycyclic aromatic hydrocarbon quantum dot capable of blue light emission according to an embodiment of the present invention. Hereinafter, the present invention will be described in more detail through experimental examples.

Experimental Example 1: Preparation of ZnO-50 Quantum Dot

ZnO quantum dot with high concentration of interstitial $Zn_i$ defect was prepared by solution coprecipitation. A reducing agent, solution A, was prepared by dissolving 5 μM of tetramethylammonium hydroxide (TMAH) in 10 ml of pure ethanol at room temperature, and 3 μM of zinc acetate $((Zn(CH_2COOH)_2)$ was completely dissolved in 30 ml of DMSO at room temperature for about 30 minutes to form a precursor, solution B. Solution B was titrated to solution A at a rate of 0.666 ml/min, and then stirred at a temperature of 50° C. for 1 hour to prepare ZnO quantum dot. The prepared ZnO quantum dot was washed with an acetone solution, and was collected for 10 minutes through a centrifuge rotating at a speed of 12,000 rpm, and was re-dispersed and used by an ultrasonic wave in 15 ml of ethanol solution during use.

Experimental Example 2: Preparation of ZnO@ANSA Quantum Dot 500 mg of 5-Amino-2-naphthalenesulfonic acid ($H_2NC_{10}H_6SO_3H$, ANSA) was uniformly dispersed in 40 ml of dimethylformamide (DMF) to prepare an ANSA solution, and 1.2 g of the ZnO quantum dot prepared in Experimental Example 1 were dispersed in 300 ml of DMF to prepare ZnO quantum dot solution. After preparing the ZnO quantum dot solution, the ANSA solution was slowly stirred and added to the ZnO quantum dot solution. A solution in which the ANSA solution was mixed with the ZnO quantum dot solution was heated to the temperature of 120° C. and maintained for 5 hours to prepare the quantum dot in which ANSA was bonded to ZnO, that is, ZnO@ANSA. Then, after purification with toluene, acetone, etc., ZnO@ANSA was extracted in a centrifuge and dried at 70° C.

Figure 4A:
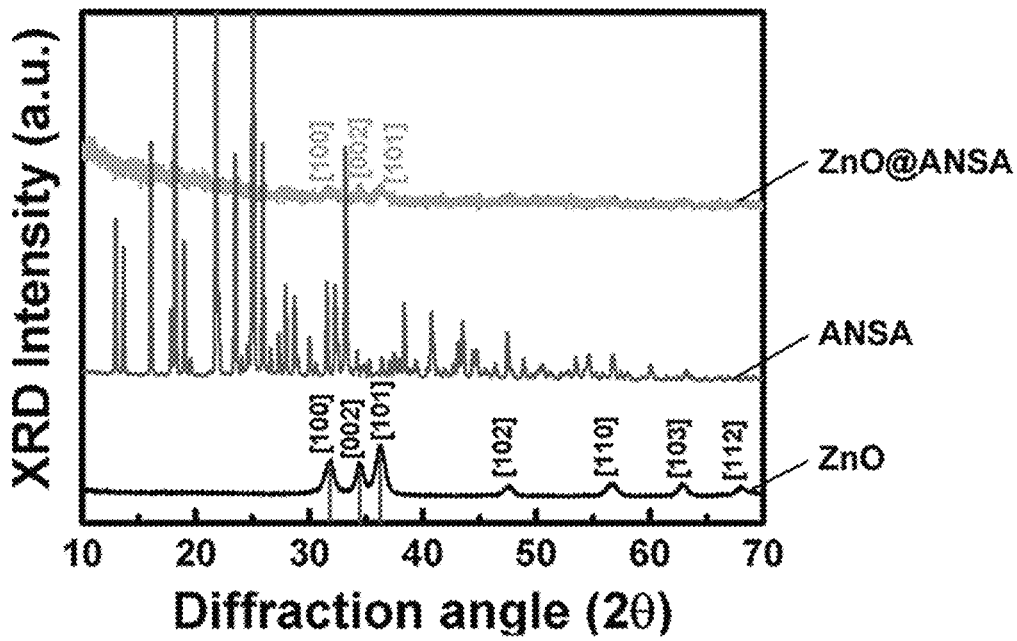
FIG. 4A shows the X-ray diffraction analysis results for the ZnO quantum dot, ANSA and ZnO@ANSA quantum dot of Experimental Example 1.

Experimental Example 3: Characteristic Analysis of ZnO Quantum Dot, ANSA, and ZnO@ANSA Quantum Dot X-ray diffraction analysis was conducted on the ZnO quantum dot, the ANSA and the ZnO@ANSA quantum dot. Referring to FIG. 4A, in the case of ZnO quantum dot, all the diffraction planes of ZnO (100), (002), (101), (102), (110), (103), and (112) were observed, very similar to the case of bulk ZnO. Many sharp diffraction patterns were observed for ANSA molecule, which were due to the microcrystalline structure of ANSA. In the X-ray diffraction pattern of the ZnO@ANSA core-shell structure, the main diffraction patterns of ZnO were reduced by ANSA, but the diffraction patterns of ZnO (100), (002), and (101) were observed as they were.

Figure 4B:
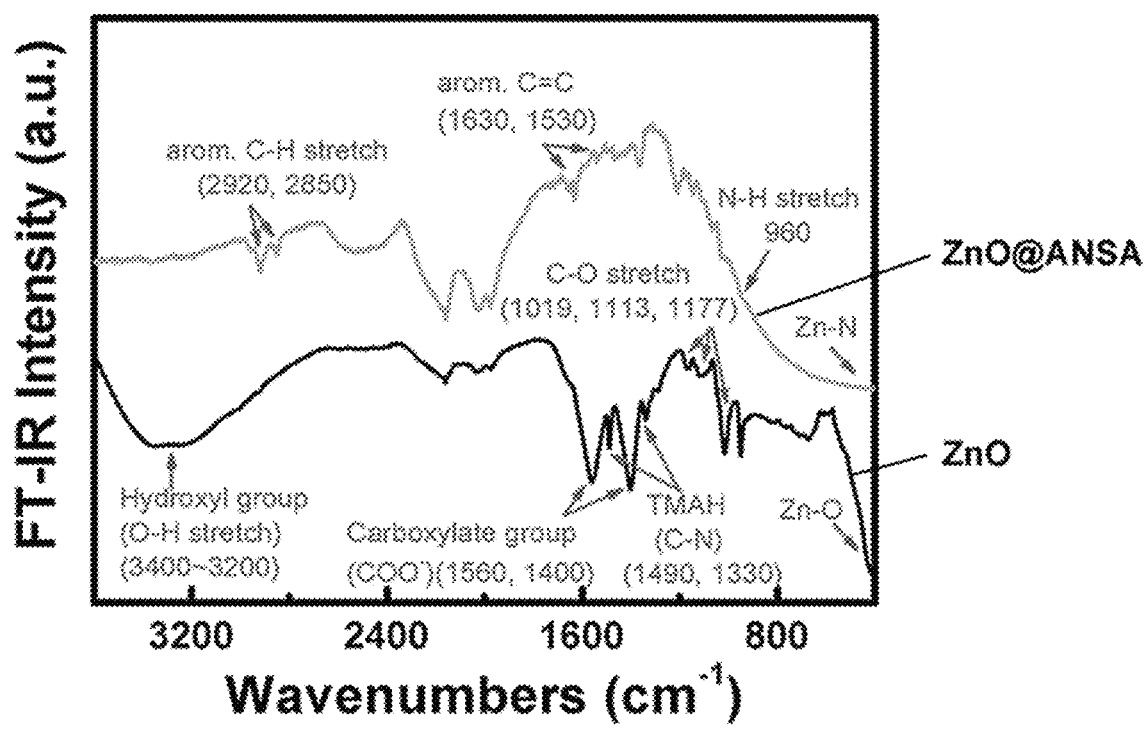
FIG. 4B shows the analysis results of fourier transform infrared (FT-IR) absorption for the ZnO quantum dot and ZnO@ ANSA quantum dot of Experimental Example 1.

FT-IR analysis was conducted on the ZnO quantum dot and the ZnO@ANSA. Referring to FIG. 4B, it was found that on the surface of the ZnO quantum dot prepared in Experimental Example 1, —OH (3200 cm$^{-1}$ to 3400 cm$^{-1}$), —COO (1400 cm$^{-1}$, 1560 cm$^{-1}$), C—N bonding (1330 cm$^{-1}$, 1490 cm$^{-1}$) by the TMAH reducing agent were remained. On the surface of the ZnO@ANSA quantum dot prepared in Experimental Example 2, ANSA-related C—H bond (2920 cm$^{-1}$, 2850 cm$^{-1}$), C=C bond (1630 cm$^{-1}$, 1530 cm$^{-1}$), and N—H bond (960 cm$^{-1}$) were observed.

Figure 4C:
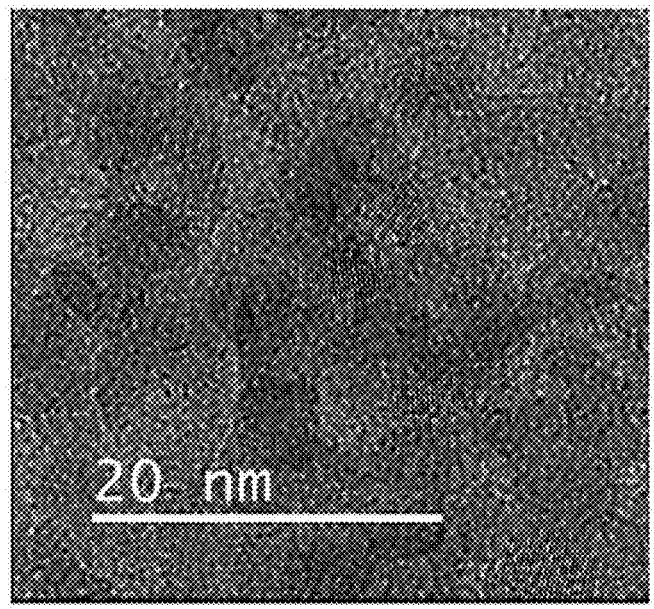
FIGS. 4C and 4D are photographs of transmission electron microscope (TEM) of ZnO quantum dot and ZnO@ANSA quantum dot, respectively.
Figure 4D:
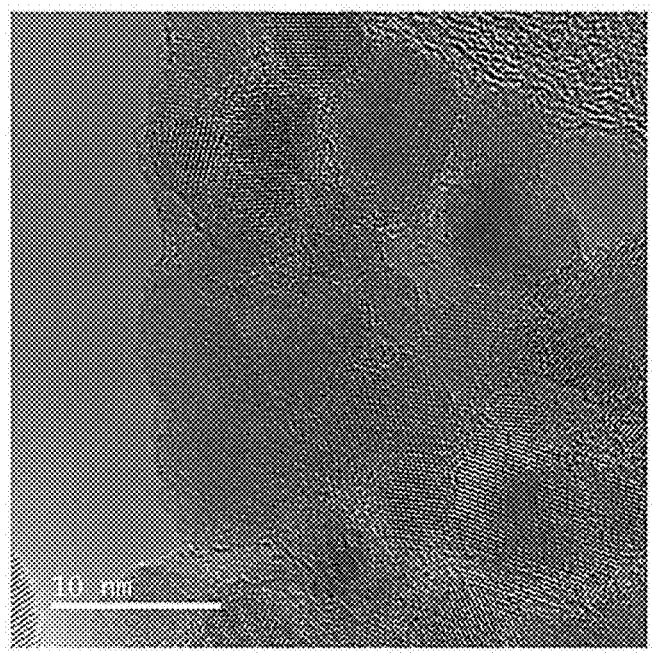

In addition, it was confirmed that the average sizes of ZnO quantum dot and ZnO@ANSA quantum dot were 4.8 nm and 6.1 nm through the TEM photographs of FIGS. 4C and 4D.

Experimental Example 3: Energy Level Analysis of ZnO Quantum Dot and ANSA

The energy levels of ZnO quantum dot and ANSA were analyzed, respectively, using absorption spectra, emission spectra, photoluminescence excitation (PLE) spectra, and ultraviolet photoemission spectroscopy of ZnO quantum dot, ANSA and ZnO@ANSA quantum dot.

Figure 5:
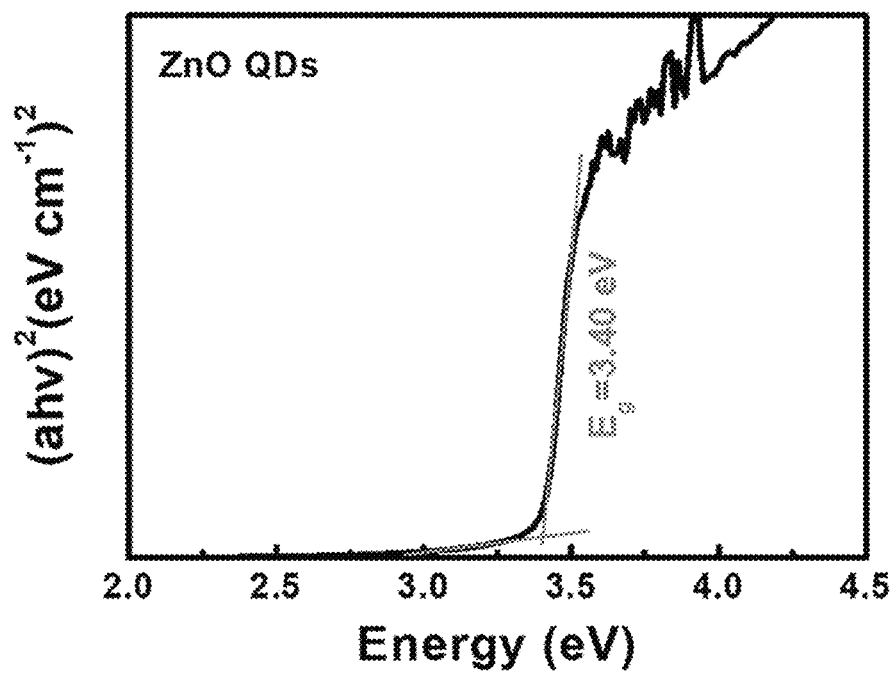
FIG. 5 shows a Tauc plot obtained from the absorption spectrum of the ZnO quantum dot of Experimental Example 1.

FIG. 5 shows a Tauc Plot calculated from the absorption spectrum of ZnO quantum dot, which is a graph showing the $(\alpha h v)^2 = A(hv - E_g)$ relationship. Here, the portion meeting the x-axis corresponds to the bandgap ($E_g$), which was measured as $E_g = 3.4$ eV by extrapolation.

Figure 6A:
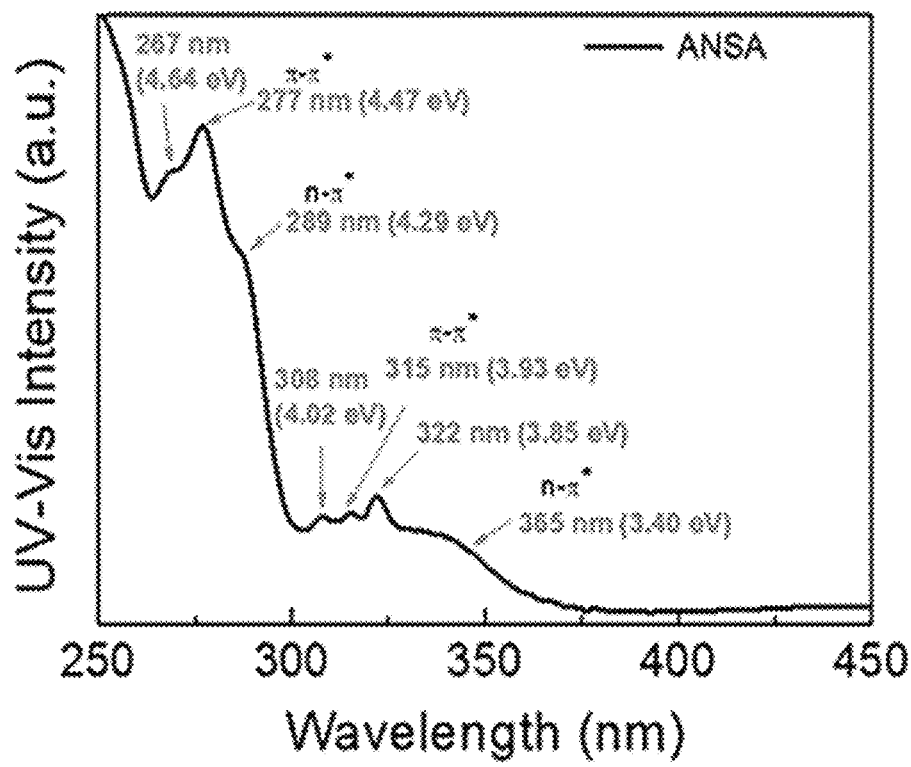
FIG. 6A shows an ultraviolet-visible absorption spectrum of ANSA.
Figure 6B:
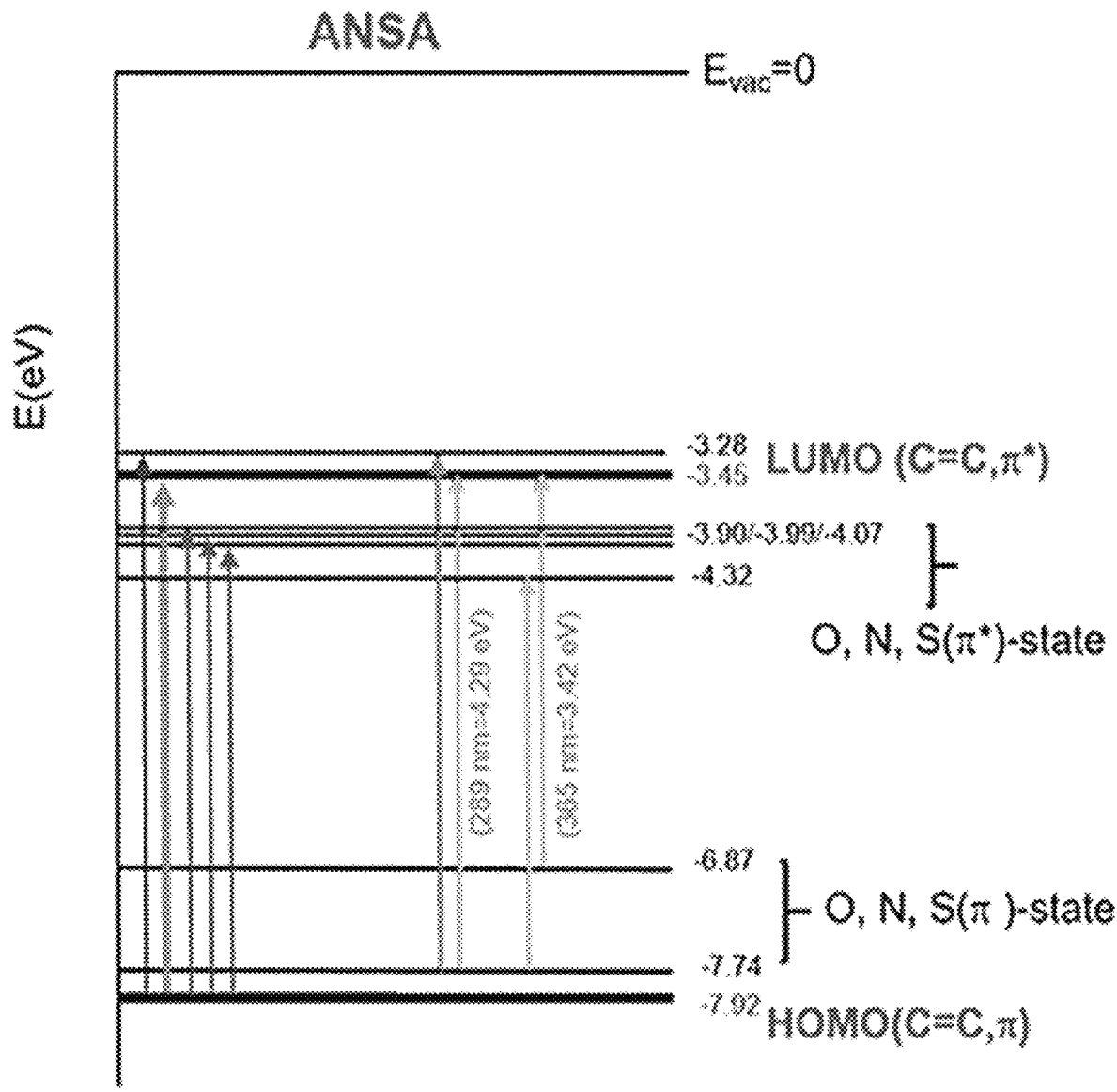
FIG. 6B shows the energy level of ANSA.

FIG. 6A shows an absorption spectrum of ANSA, and FIG. 6B shows an energy level of ANSA. In the ANSA absorption spectrum of FIG. 6A, 277 nm (=4.47 eV) refers to the light absorption wavelength due to the photoexcitation electron transition from HOMO (C=C, $\pi$) to LUMO (C=C, $\pi^*$), and 267 nm (=4.64 eV) is 0.17 eV higher energy level in HOMO than that of LUMO, and corresponds to the light absorption due to photoexcitation electron transition.

289 nm (=4.29 eV) corresponds to the light absorption, (n-$\pi^*$), from the energy level, n ($\pi$) of the bonding orbital ($\pi$) of the non-bonding state (n) formed immediately above the HOMO induced by the NH$_2$, (S=O)$_2$-OH functional groups included in ANSA, to LUMO. 308 nm (=4.02 eV), 315 nm (=3.93 eV), and 322 nm (=3.85 eV) correspond to the light absorption from HOMO to the energy levels, n($\pi^*$), of the anti-bonding orbital ($\pi^*$) of the non-bonding state (n) under the LUMO, respectively. 362 nm (=3.42 eV) represents the light absorption from the highest energy level (−6.87 eV) of the bonding orbital of the non-bonding state to LUMO, or from the lowest energy level (−7.74 eV) of the bonding orbital of the non-bonding state to the lowest energy level (−4.32 eV), n($\pi^*$) level, of the anti-bonding orbital of the non-bonding state.

Figure 7A:
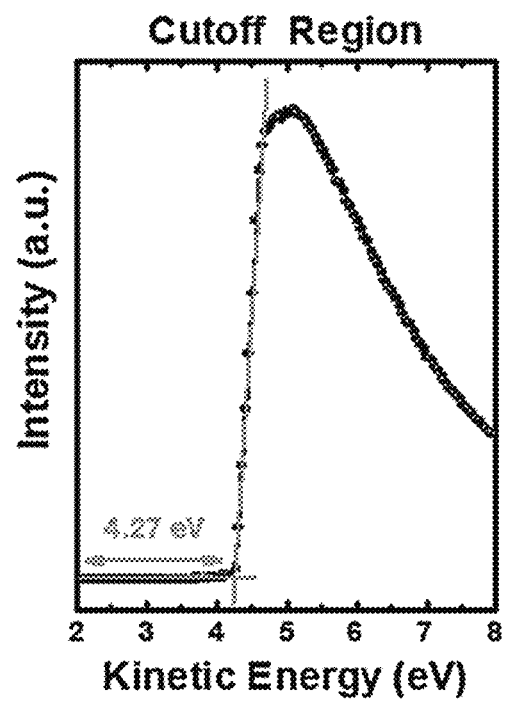
FIGS. 7A and 7B show ultraviolet photoemission spectroscopy (UPS) spectra of ANSA.
Figure 7B:
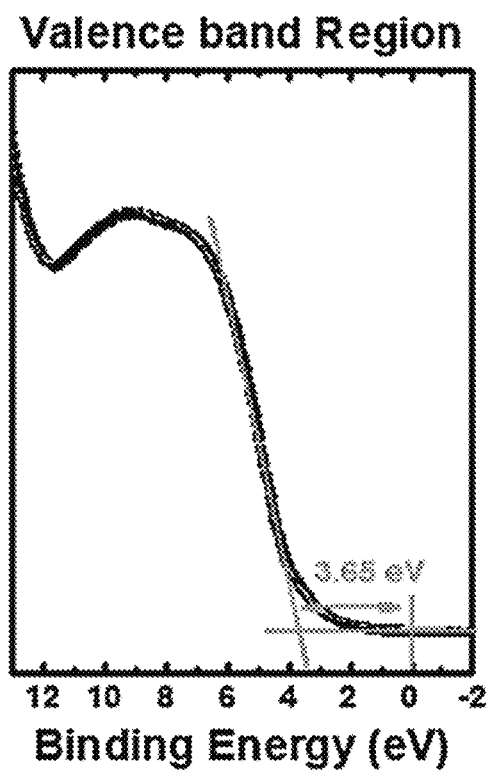

Regarding the LUMO and HOMO of ANSA, from the energy difference (−3.65 eV) (see FIG. 7B) between the Fermi energy level (−4.27 eV) (see FIG. 7A) obtained by a secondary electron cut-off method in an ultraviolet photoelectron spectroscopy (UPS) and the HOMO, the energy level of HOMO is defined as (−4.27 eV)+(−3.65 eV)=−7.92 eV from a vacuum energy level ($E_{Vac}$), and the energy level of LUMO is defined as (−7.92 eV)+(4.47 eV)=−3.45 eV from the light absorption peak of 277 nm (=4.47 eV) of HOMO and LUMO.

Figure 7C:
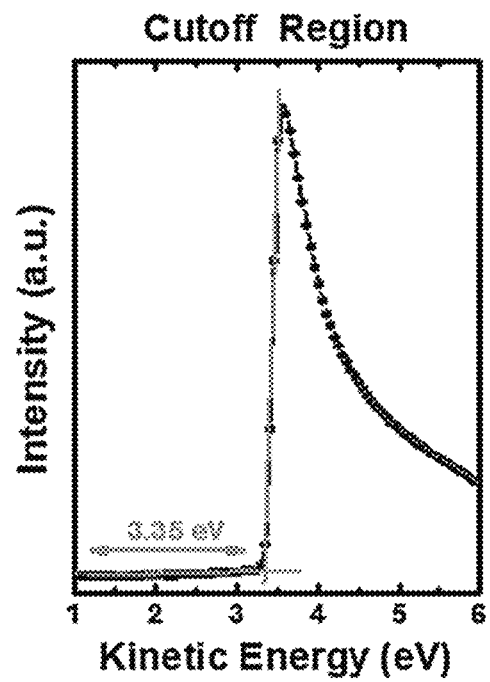
FIGS. 7C and 7D are UPS spectra of ZnO quantum dot.
Figure 7D:
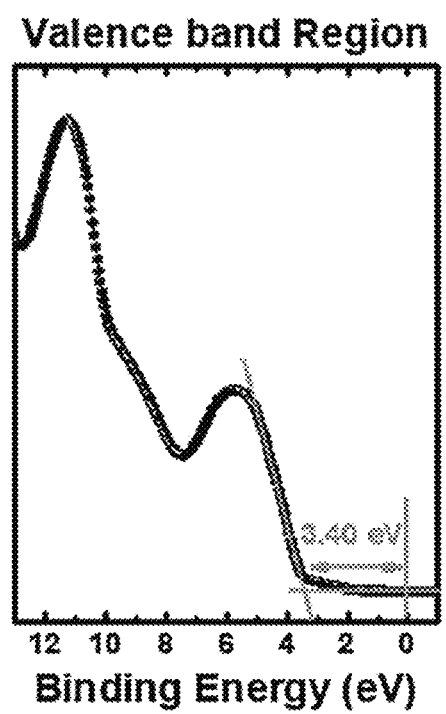

The conduction band (CB) and valence band (VB) of ZnO quantum dot were also calculated using the above method. From the energy difference (−3.40 eV) (see FIG. 7D) between the Fermi energy level (−3.35 eV) (see FIG. 7C) of ZnO and the valence band (VB), the energy of the valence band (VB) is defined as (−3.35 eV)+(−3.40 eV)=−6.75 eV from the vacuum energy level ($E_{Vac}$), and the energy level of the conduction band (CB) is defined as (−6.75 eV)+(3.40 eV)=−3.35 eV from the bandgap ($E_g$=3.4 eV) obtained from the Tauc plot of FIG. 5.

Figure 8A:
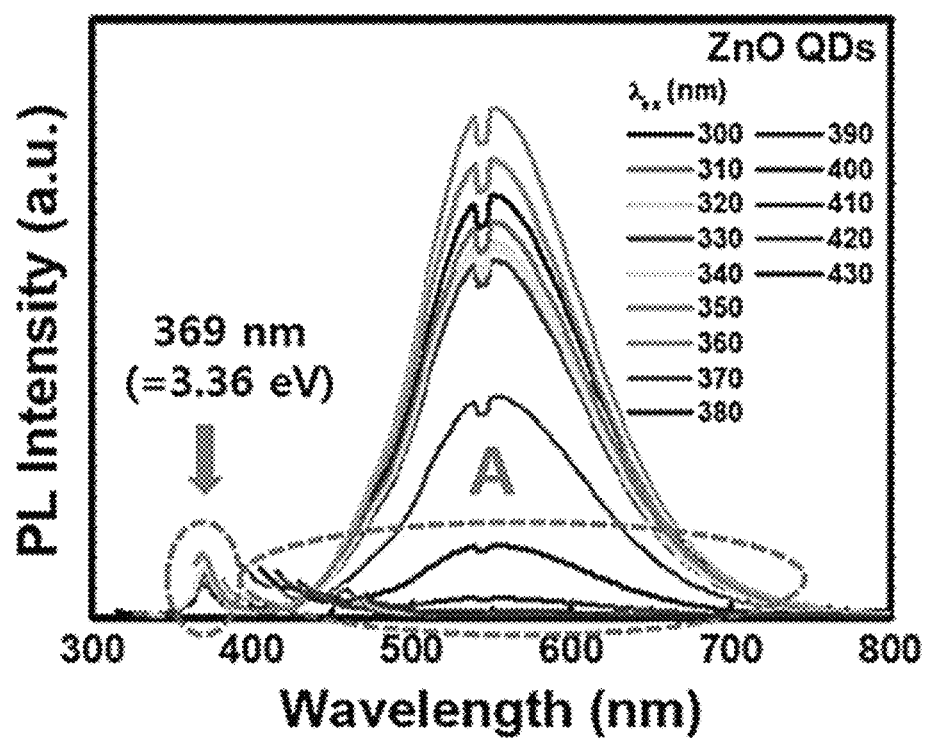
FIG. 8A shows an emission curve of ZnO quantum dot.
Figure 8B:
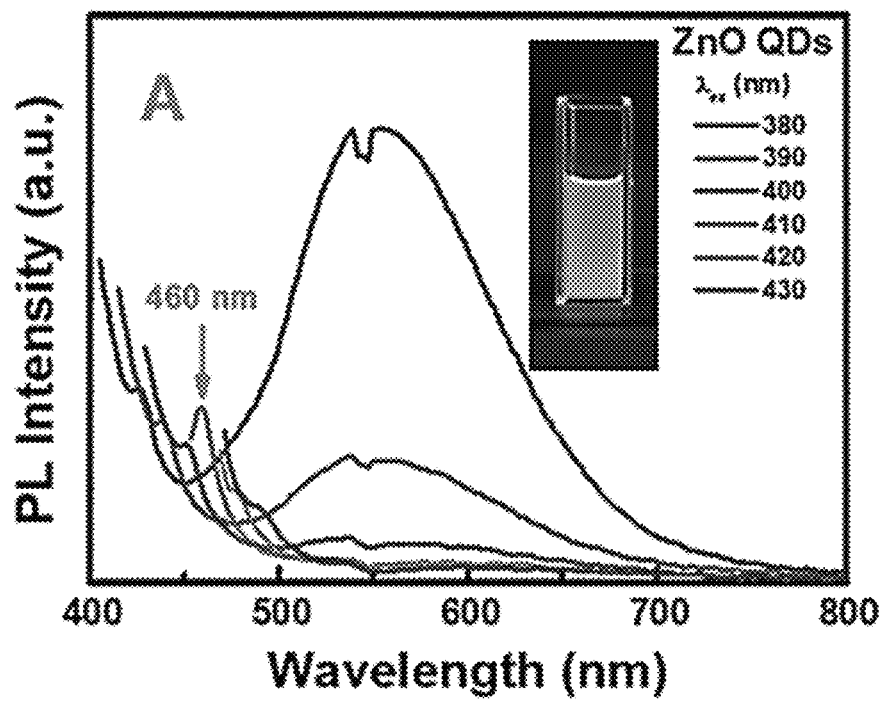
FIG. 8B is an enlarged view of part 'A' of FIG. 8A.
Figure 8C:
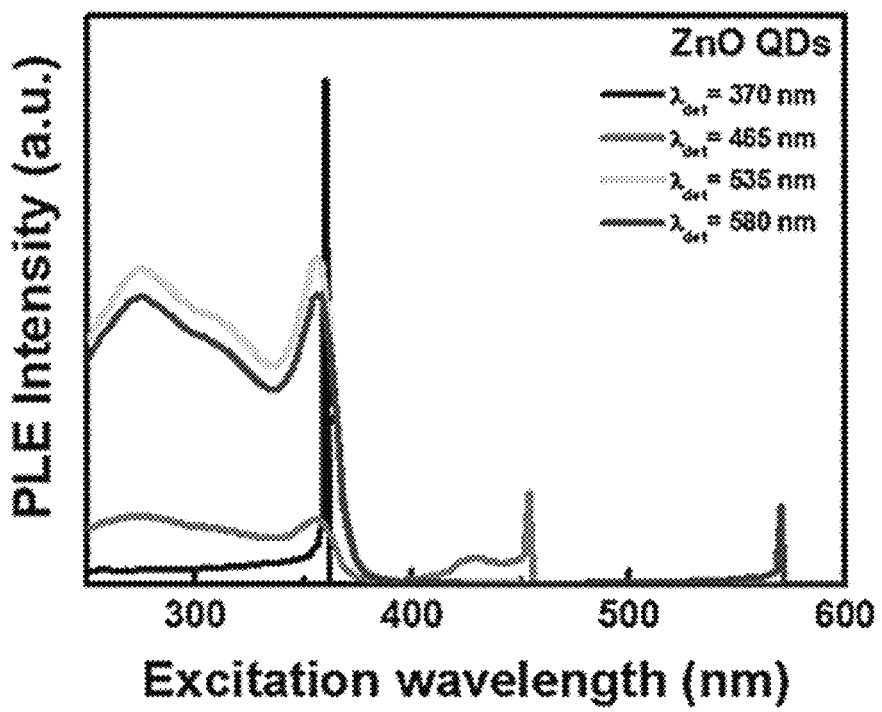
FIG. 8C shows a photoluminescence excitation (PLE, luminescence excitation) at detection wavelengths of 370 nm, 465 nm, 535 nm and 580 nm.
Figure 8D:
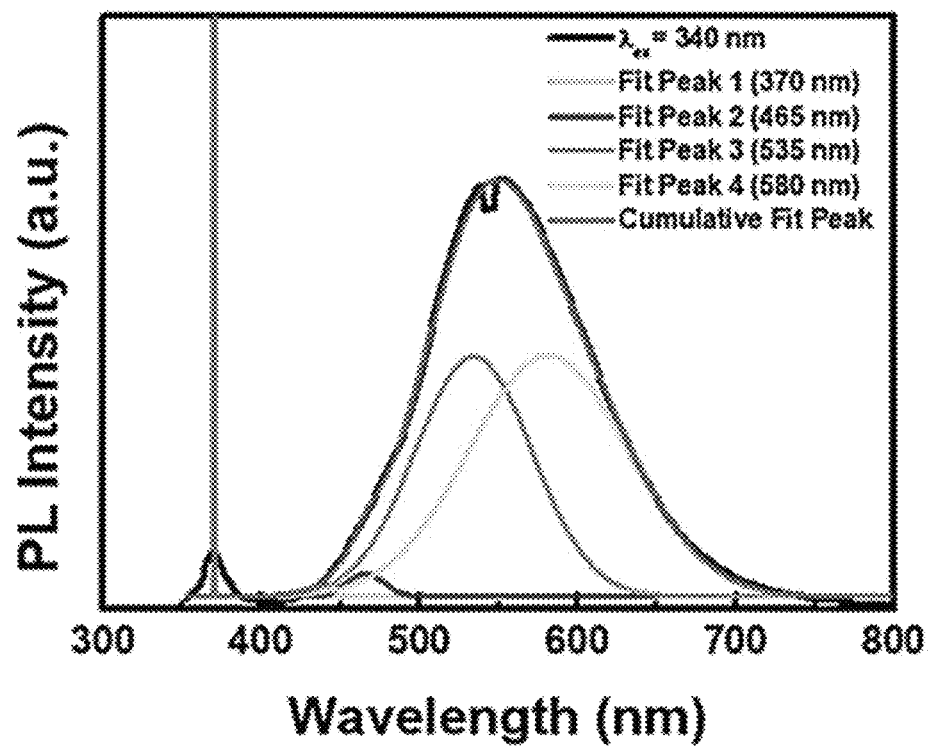
FIG. 8D shows a Gaussian fitting result of the emission curve observed at an excitation wavelength of 340 nm.
Figure 8E:
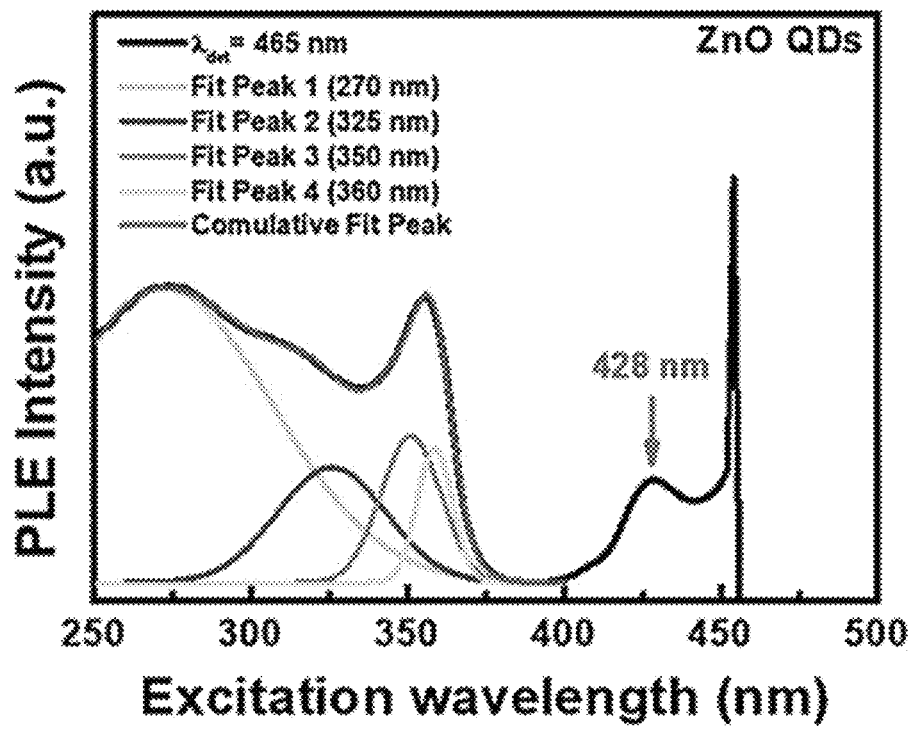
FIG. 8E shows a Gaussian fitting result of a PLE curve at a detection wavelength of 465 nm.

FIG. 8A shows an emission curve according to the excitation wavelength ($\lambda_{ex}$) (300 to 430 nm) of the ZnO quantum dot prepared according to Experimental Example 1. Although the intensity is weak as shown in FIG. 8A, the curve is observed at 369 nm (=3.36 eV) near the bandgap. As the excitation wavelength ($\lambda_{ex}$) increases from 300 nm, the yellow light emission with a center around 550 nm is observed, and the intensity of the emission curve becomes maximum at $\lambda_{ex}$=360 nm. When the excitation wavelength ($\lambda_{ex}$) is changed to a longer wavelength, the intensity of light emission decreases gradually and the emission is observed up to 400 nm (see FIG. 8B, which is an enlarged portion of 'A' in FIG. 8A), but the light emission quenches at the longer wavelength, $\lambda_{ex}$=410 to 430 nm. Instead, only the blue light emission centered at 460 nm is observed. FIG. 8D shows an emission curve measured at $\lambda_{ex}$=340 nm, and the curve consists of three sub-peaks centered at 465 nm, 535 nm, and 580 nm. FIG. 8C shows photoluminescence excitation (PLE) spectra for 465 nm, 535 nm, and 580 nm. It can be seen that the yellow light emissions at 535 nm and 580 nm are mostly observed as light emissions due to the energy level near 360 nm, whereas the blue light emission of 465 nm is due to the energy level near 430 nm in addition to the energy level near 360 nm. In more detail, it can be seen that the energy levels of 270 nm, 325 nm, 350 nm, 360 nm, and 428 nm contribute to the blue light emission of 465 nm, as shown in FIG. 8E.

Figure 8F:
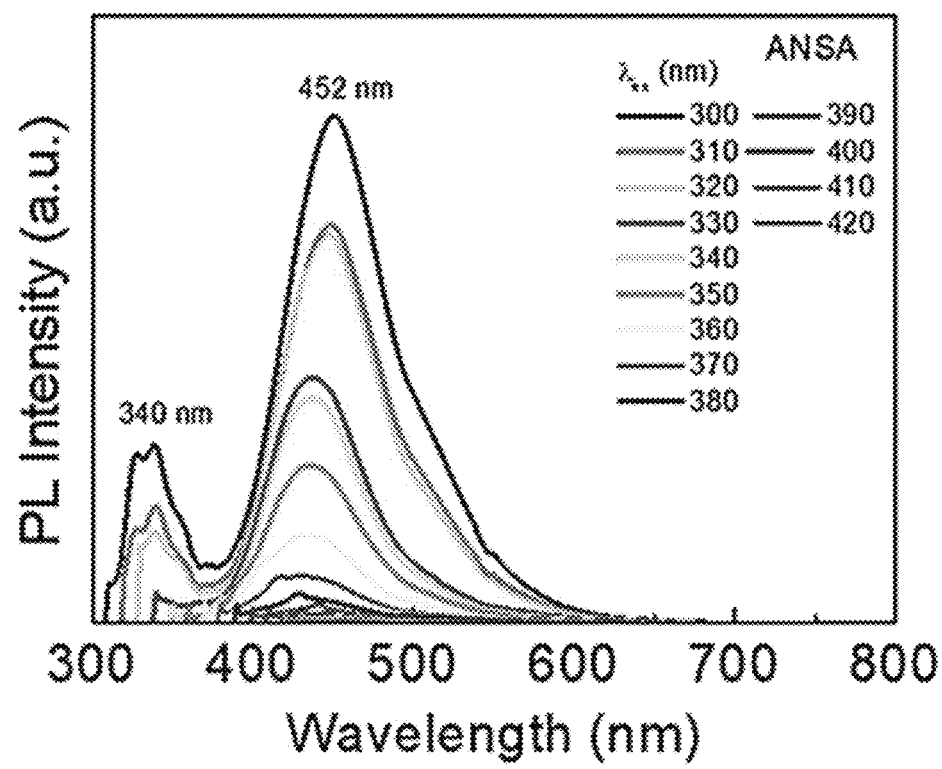
FIG. 8F shows an emission curve of ANSA.
Figure 8G:
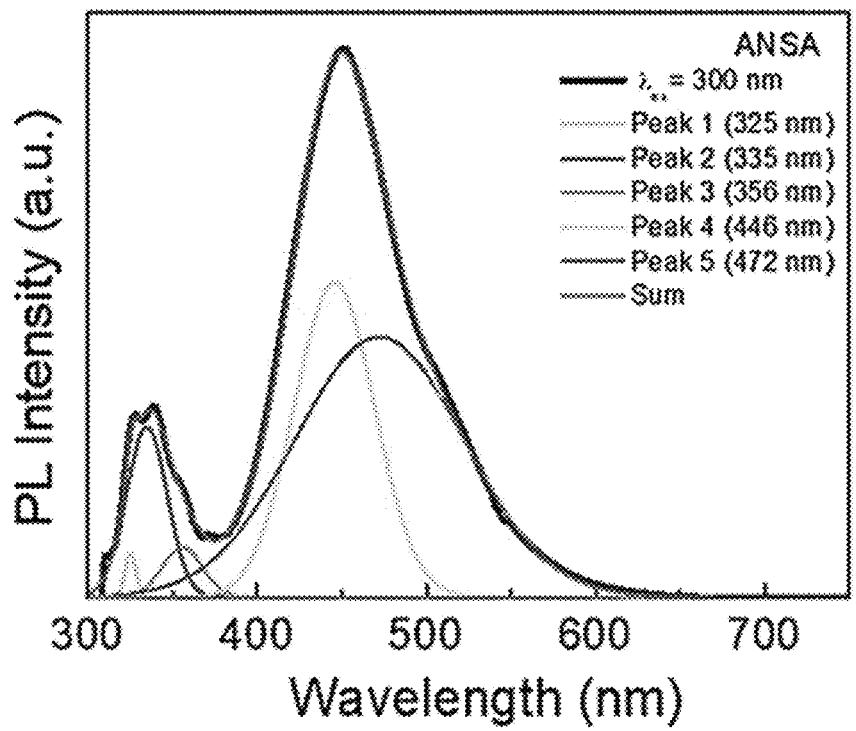
FIG. 8G shows a result of Gaussian fitting of an emission curve at an excitation wavelength of 300 nm.
Figure 8H:
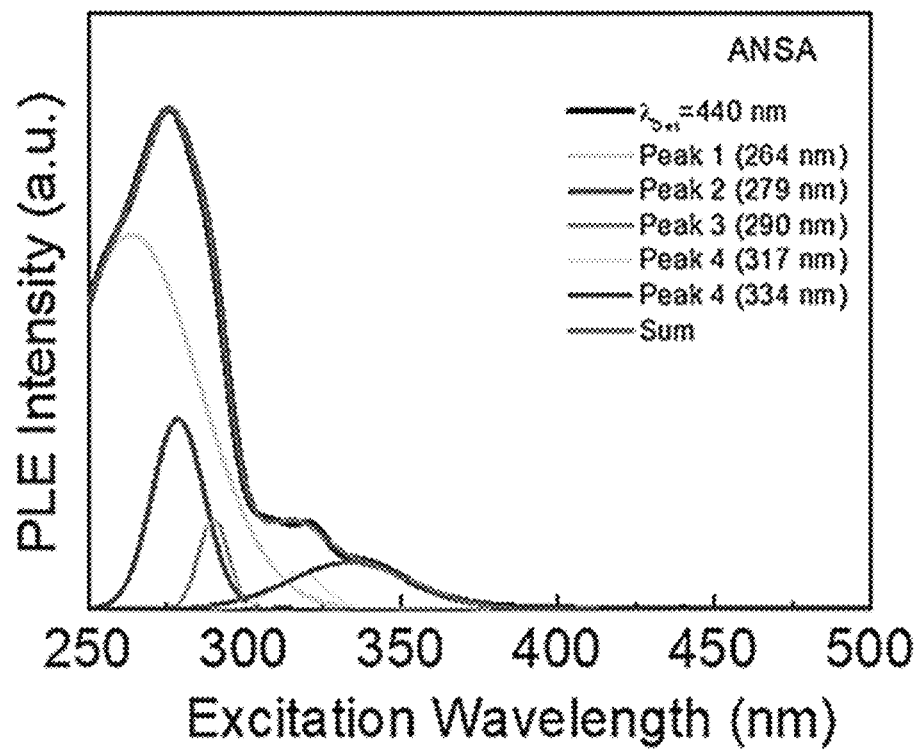
FIG. 8H shows a result of Gaussian fitting of a PLE curve of a detection wavelength of 440 nm.

FIG. 8F shows an emission curve for ANSA according to a change in an excitation wavelength ($\lambda_{ex}$), which shows the near-UV and blue light emission centered at 340 nm and 452 nm. Unlike the ZnO quantum dot, the emission intensity shows a maximum value at $\lambda_{ex}$=300 nm, and the emission intensity decreases continuously as the excitation wavelength increases. FIG. 8G shows an emission curve obtained at $\lambda_{ex}$=300 nm, and it can be seen that the curve consists of five sub-peaks centered at 325 nm, 335 nm, 356 nm, 446 nm, and 472 nm. FIG. 8H is a PLE spectrum for examining energy levels contributing to a wavelength of 440 nm, similar to the 446 nm sub-curve of FIG. 8G. Five energy levels of 264 nm, 279 nm, 290 nm, 317 nm, and 334 nm contribute the light emission. It can be seen that this is almost identical to the absorption peaks of 267 nm, 277 nm, 289 nm, 308 nm, 315 nm, 322 nm, and 365 nm obtained from the ultraviolet-visible absorption spectrum of FIG. 6A. The difference is that the four peaks of 308 nm, 315 nm, 322 nm, and 365 nm of the ultraviolet-visible absorption spectrum were measured to consist of only two peaks of 317 nm and 334 nm in the PLE spectrum.

Figure 8I:
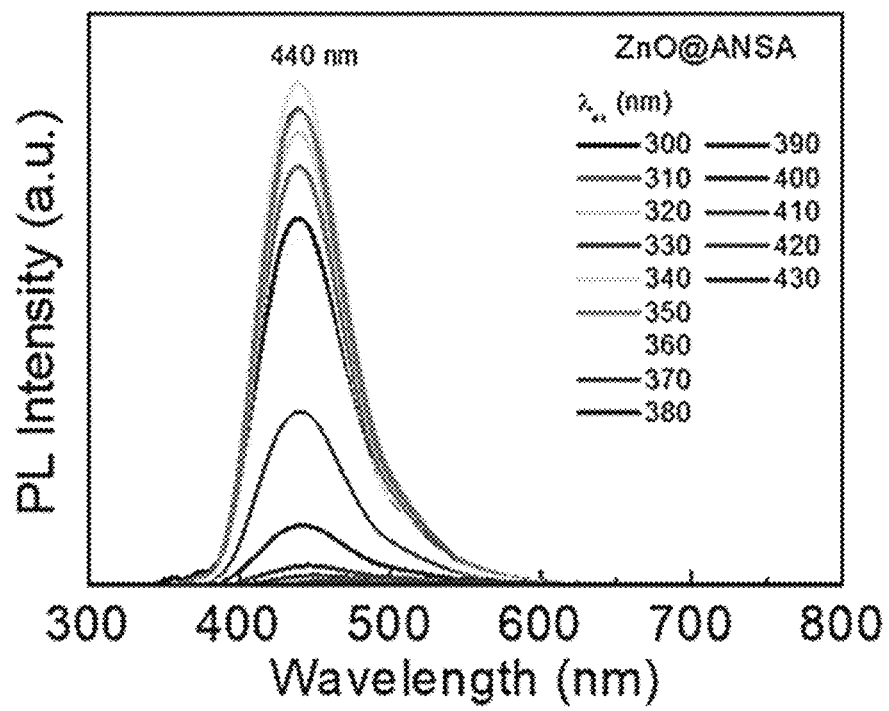
FIG. 8I shows an emission curve of ZnO@ANSA quantum dot.
Figure 8J:
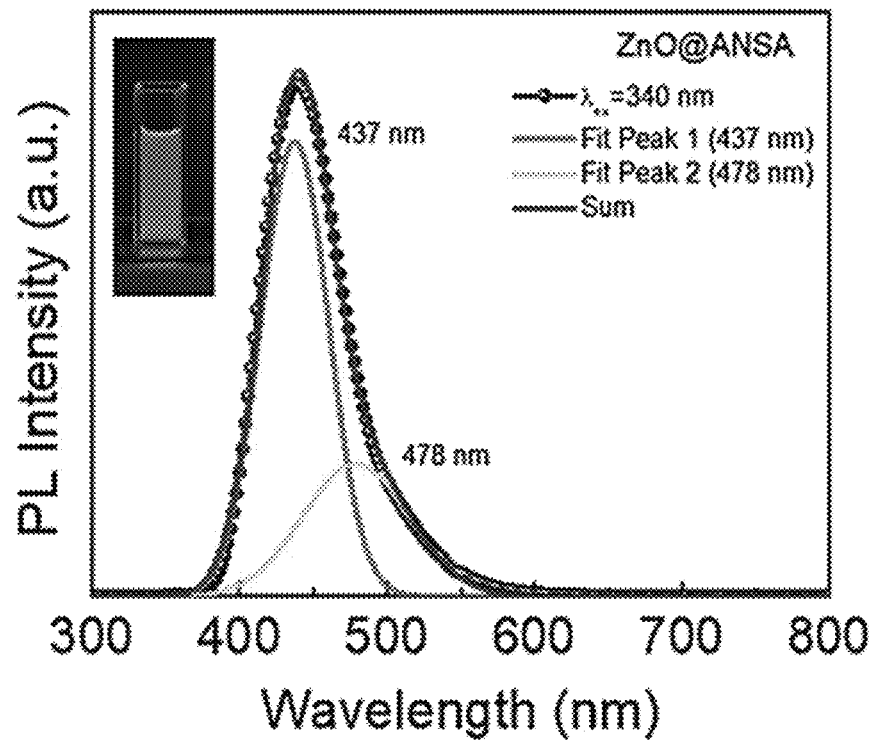
FIG. 8J shows a Gaussian fitting result of an emission curve observed at an excitation wavelength of 340 nm.
Figure 8K:
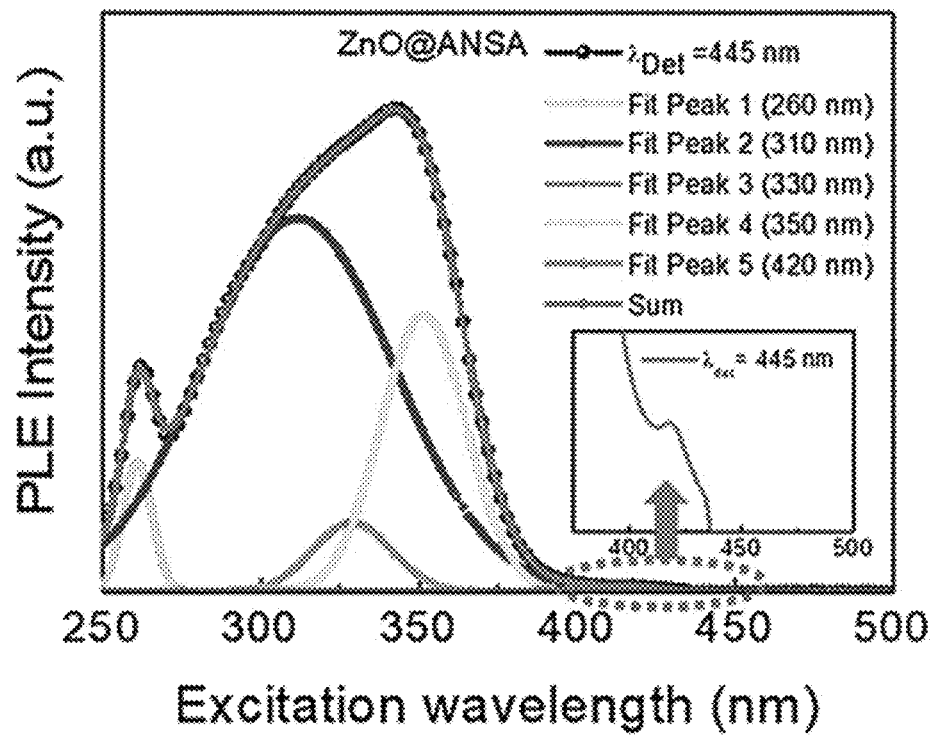
FIG. 8K shows a Gaussian fitting result of a PLE curve at a detection wavelength of 445 nm.

FIG. 8I shows an emission curve of ZnO@ANSA quantum dot according to the change of $\lambda_{ex}$ in which the maximum intensity at 340 nm as the wavelength increases at $\lambda_{ex}$=300 nm, and then the intensity gradually decreases again, which shows a trend different from the emission characteristics of ZnO and ANSA. FIG. 8J shows a blue light emission curve of ZnO@ANSA quantum dot obtained at $\lambda_{ex}$=340 nm, which consists of two sub-curves, 437 nm and 478 nm. When the blue light emission of 445 nm is fixed as a measurement wavelength and the energy levels contributing to this emission are examined, it can be seen that five energy levels of 260 nm, 310 nm, 330 nm, 350 nm, and 420 nm (see FIG. 8K) contribute to this emission. Here, 260 nm, 310 nm, and 330 nm are energy levels related to ANSA, and 350 nm and 420 nm are energy levels related to ZnO quantum dot.

Figure 9:
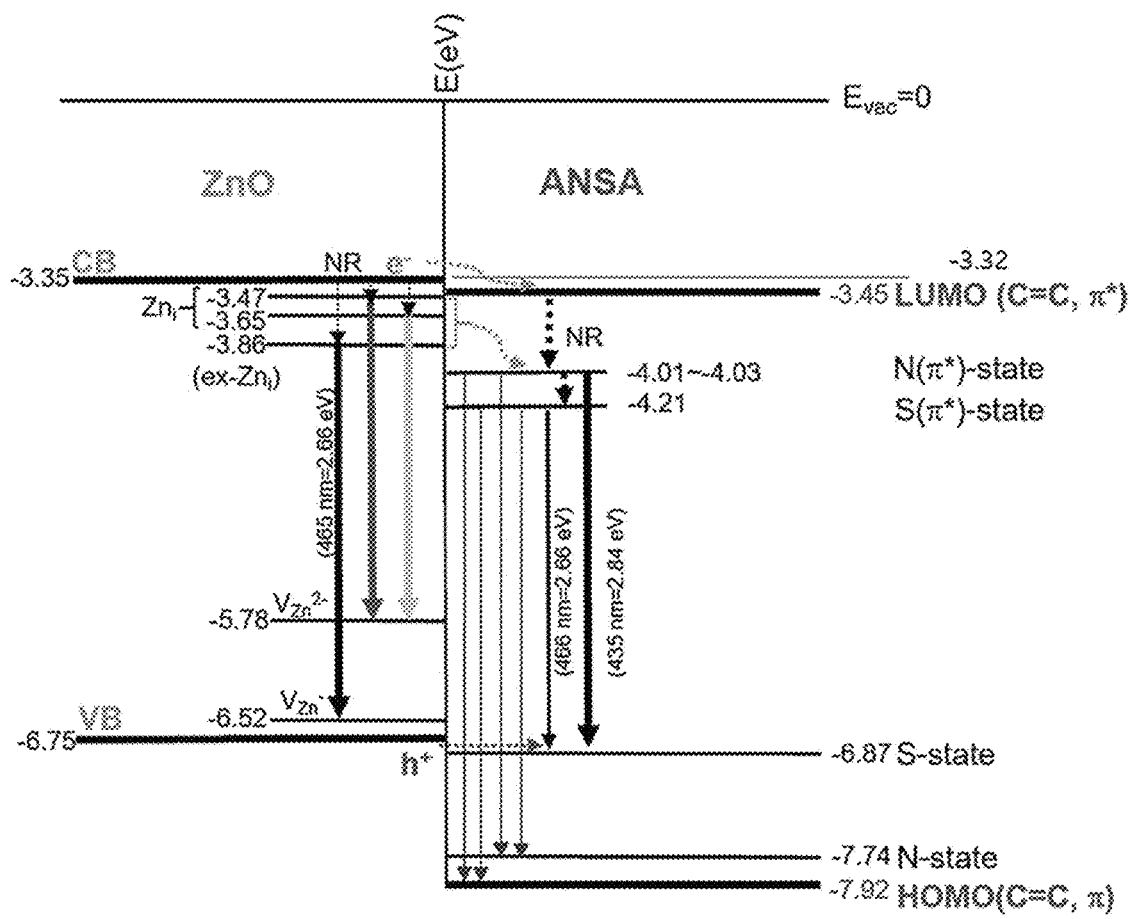
FIG. 9 is a reference view schematically illustrating the electron energy level and blue light emission mechanism of ZnO@ANSA quantum dot.

The electron energy levels of ZnO and ANSA can be determined as shown in FIG. 9 from the above results of the emission curve, UPS, PLE, etc. As shown in FIG. 9, it can be seen that the ZnO@ANSA quantum dot has the quantum dot having the Type II structure in which the LUMO (−3.45 eV) and HOMO (−7.92 eV) energy levels of ANSA are lower than the conduction band (−3.35 eV) and valence band (−6.75 eV) energy levels of ZnO.

In the case of ZnO quantum dot, the interstitial Zn ($Zn_i$) defect energy levels of −3.37 eV and −3.65 eV exist below the conduction band (CB) within the bandgap, and the extended interstitial Zn (ex-$Zn_i$) defect energy level of −3.86 eV exists below the interstitial Zn ($Zn_i$) defect energy levels. Also, above the valence band (VB), the defect energy levels of $V_{Zn}^{2-}$, which is a secondary ionized Zn vacancy, and $V_Z^{n-}$, which is a primary ionized Zn vacancy, exist at −5.78 eV and −6.52 eV, respectively. Therefore, when electrons transit from the interstitial Zn ($Zn_i$) energy levels of −3.37 eV and −3.65 eV to $V_{Zn}^{2-}$ energy level, yellow light emission is expressed, and when electrons transit from ex-$Zn_i$ to $V_{Zn}^{-}$ energy level, blue light emission is expressed.

On the other hand, in the case of ANSA, the anti-bonding orbital (π*), n (π*) of the non-bonding state (n) is formed at the energy levels of −4.01 eV to −4.03 eV, and −4.21 eV under the LUMO, and when the electrons respectively transit to the energy level, n (π) of −6.87 eV of the bonding orbital (π) of the non-bonding state (n) formed on the HOMO, the blue light emissions of 435 nm and 465 nm are expressed. Therefore, from the energy level diagram of FIG. 9, the blue light emission of ZnO@ANSA quantum dot is expressed by the charge transfer of electrons from the conduction band of ZnO, which is a core, to the LUMO of ANSA, which is a shell, and the transferred electrons are transferred to the energy levels of −4.01 eV to −4.03 eV and −4.21 eV inside the ANSA, thereby expressing blue light emission. Some electrons transferred to Zni, ex-Zni under the conduction band (CB) in the conduction band of ZnO also contribute the blue light emission by charge transfer to the energy levels of −4.01 eV to −4.03 eV and −4.21 eV inside the ANSA. Therefore, yellow and blue light emissions inside ZnO quench, and blue light emission is expressed only in ANSA, which is the shell.

Experimental Example 4: Preparation of ZnO-70 Quantum Dot

ZnO quantum dot with high concentration of interstitial $Zn_i$ defect was prepared by solution coprecipitation. A reducing agent, solution A, was prepared by dissolving 5 μM of TMAH salt in 10 ml of pure ethanol at room temperature, and 3 μM of zinc acetate (($Zn(CH_2COOH)_2$) was completely dissolved in 30 ml of DMSO at room temperature for about 30 minutes to form a precursor, solution B. Solution B was titrated to solution A at a rate of 0.666 ml/min, and then stirred at a temperature of 70° C. for 1 hour to prepare ZnO quantum dot. The prepared ZnO quantum dot was washed with an acetone solution, and was collected for 10 minutes through a centrifuge rotating at a speed of 12,000 rpm, and was re-dispersed and used by an ultrasonic wave in 15 ml of ethanol solution during use.

Experimental Example 5: Preparation of ZnO@ Aminopyrene Quantum Dot 500 mg of 1-Amino-Pyrene was uniformly dispersed in 40 ml of DMF to prepare 1-Amino-Pyrene solution, and 1.2 g of the ZnO quantum dot prepared in Experimental Example 4 were dispersed in 300 ml of DMF to prepare ZnO quantum dot solution. After preparing the ZnO quantum dot solution, the 1-Amino-Pyrene solution was slowly stirred and added to the ZnO quantum dot solution. Then, a solution in which the 1-Amino-Pyrene solution was mixed with the ZnO quantum dot solution was heated to the temperature of 120° C. and maintained for 5 hours to prepare the quantum dot in which 1-Amino-Pyrene was bonded to ZnO, that is, ZnO@Aminopyrene. Then, after purification with toluene, acetone, etc., ZnO@Aminopyrene was extracted in a centrifuge and dried at 70° C.

Experimental Example 6: Energy Level Analysis of ZnO Quantum Dot and Aminopyrene The energy levels of ZnO quantum dot and ANSA were analyzed, respectively, using absorption spectra, emission spectra, photoluminescence excitation (PLE) spectra, and ultraviolet photoemission spectroscopy (UPS) of ZnO quantum dot, Aminopyrene and ZnO@Aminopyrene quantum dot.

Figure 10A:
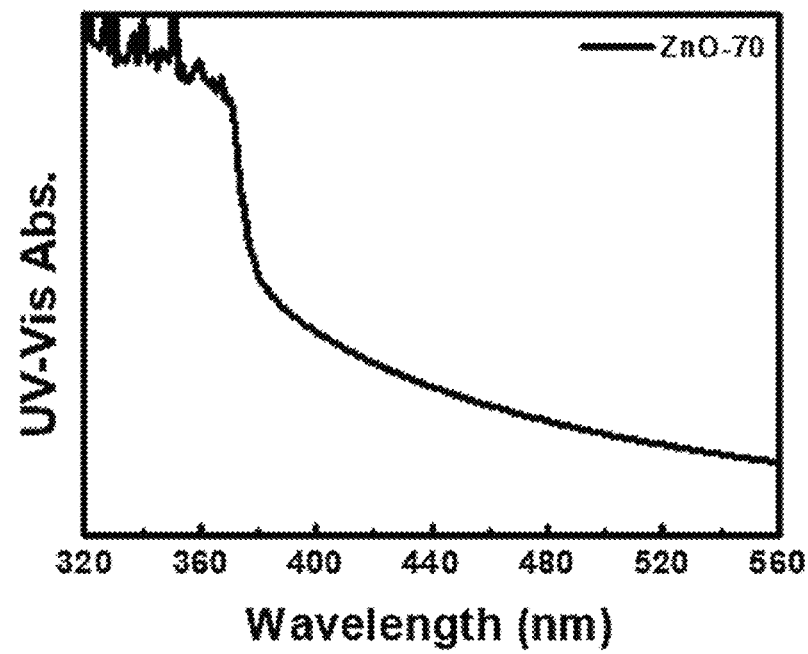
FIG. 10A shows an ultraviolet-visible absorption spectrum of ZnO-70 quantum dot of Experimental Example 4.
Figure 10B:
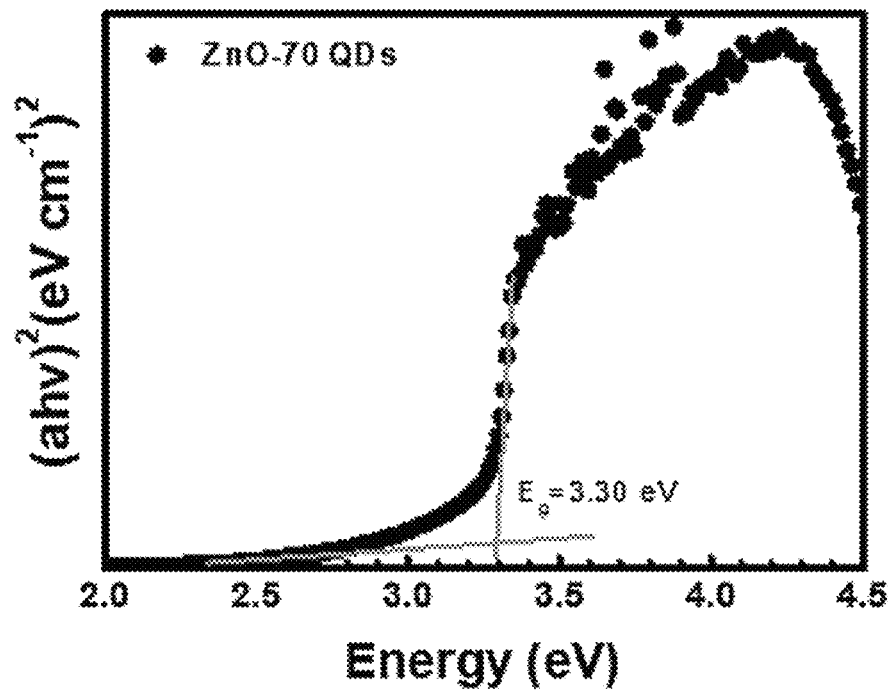
FIG. 10B shows a Tauc plot obtained from FIG. 10A.

FIG. 10A shows an ultraviolet-visible absorption spectrum of ZnO-70 quantum dot prepared in Experimental Example 4, and FIG. 10B shows a Tauc Plot obtained from FIG. 10A, that is, a graph showing the $(\alpha h v)^2 = A(hv - E_g)$ relationship. Here, the portion meeting the x-axis corresponds to the bandgap ($E_g$), which was measured as $E_g$=3.30 eV by extrapolation.

Figure 10C:
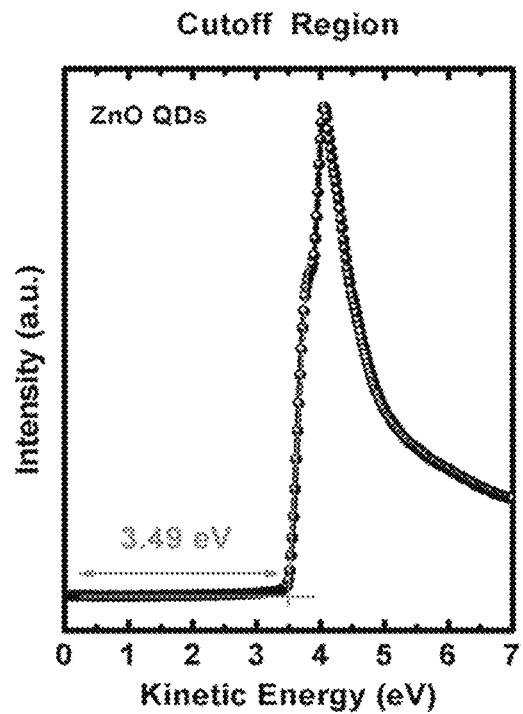
FIGS. 10C and 10D are UPS spectra of ZnO-70 quantum dot.
Figure 10D:
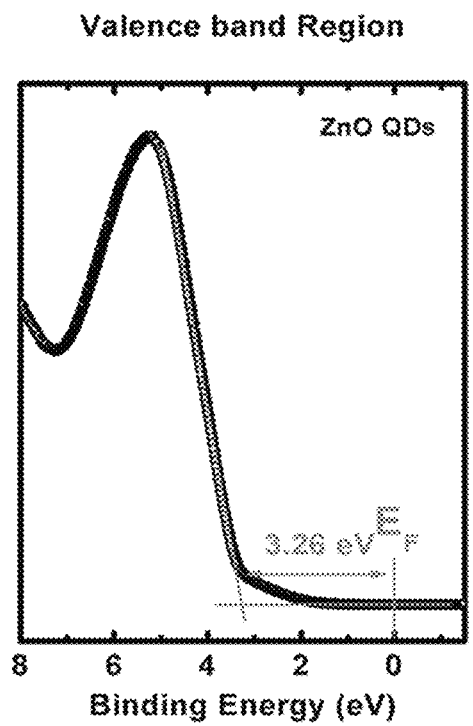

From the energy difference (3.26 eV) (see FIG. 10D) between the Fermi energy level (−3.49 eV) (see FIG. 10C) of ZnO-70 quantum dot and the valence band (VB), the energy of the valence band (VB) was defined as (−3.49 eV)+(−3.26 eV)=−6.75 eV from a vacuum energy level ($E_{Vac}$), and the energy level of the conduction band (CB) was defined as (−6.75 eV)+(3.30 eV)=−3.45 eV from the band gap $E_g$=3.3 eV obtained from the Tauc plot of FIG. 10B.

Figure 11A:
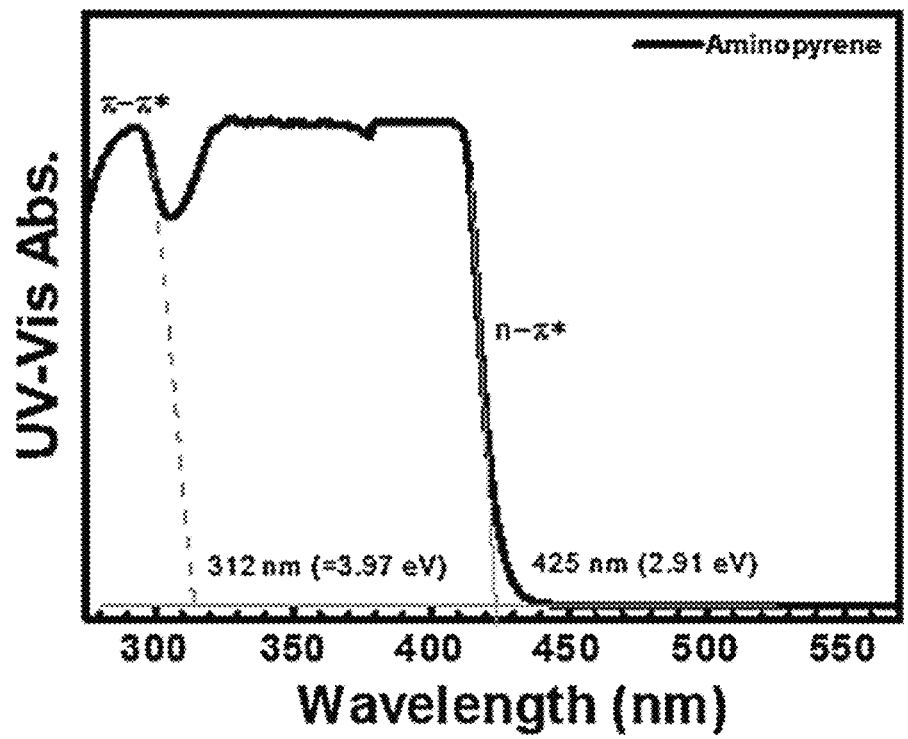
FIG. 11A shows an ultraviolet-visible absorption spectrum for 1-Aminopyrene.

FIG. 11A shows an ultraviolet-visible absorption spectrum for 1-Aminopyrene, and the portions meeting the x-axis were measured to be 312 nm (=3.97 eV) and 425 nm (=2.91 eV), respectively, by extrapolation. The former 312 nm is due to the light absorption between Pyrene HOMO (C=C, π) and LUMO (C=C, π*). The latter 425 nm is due to the light absorption (n-π*) between the bonding orbital (π), n (π) of the non-bonding state (n) formed immediately above the HOMO induced by the $NH_2$ functionalization group contained in 1-Aminopyrene and LUMO (C=C, π*).

Figure 11B:
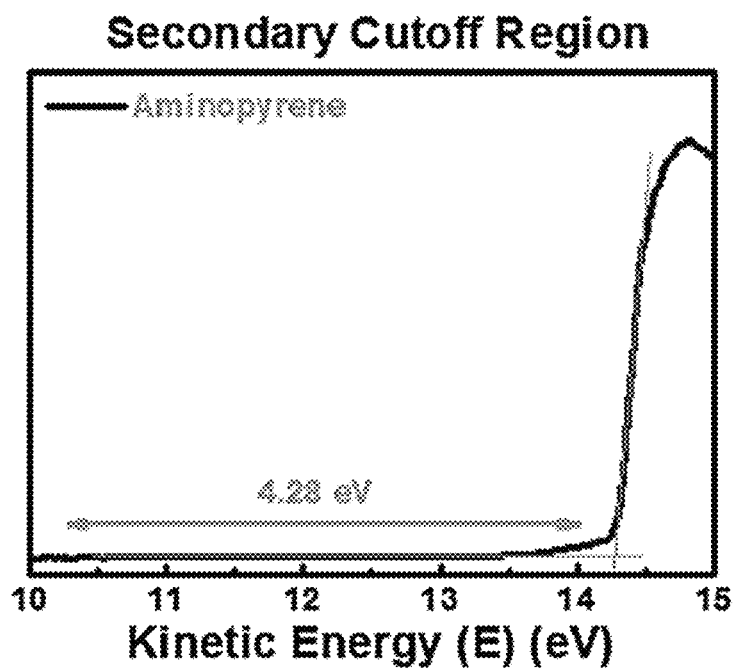
FIGS. 11B and 11C show UPS spectra.
Figure 11C:
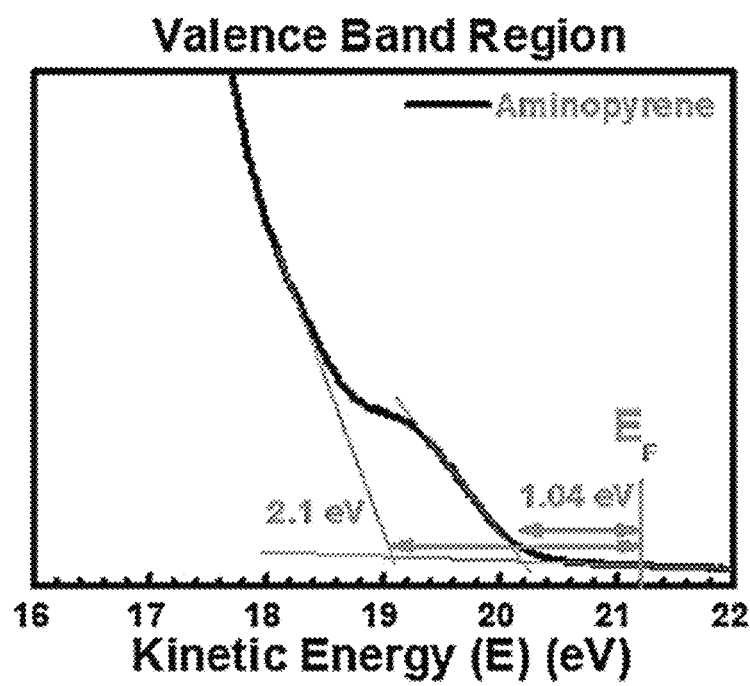
Figure 12:
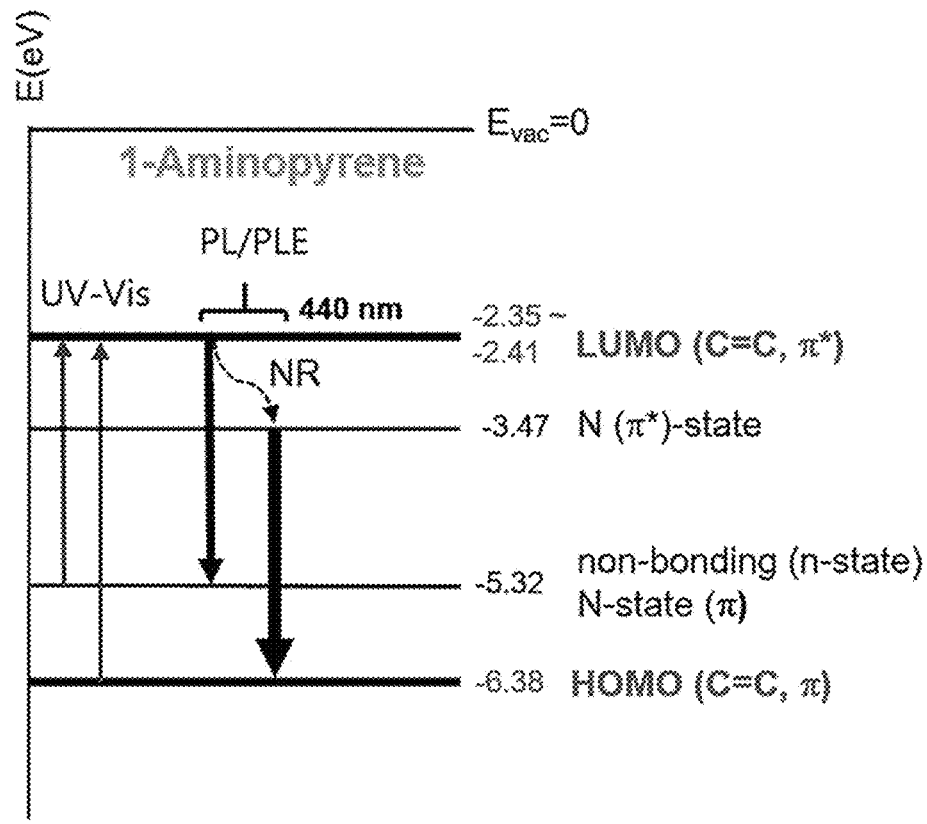
FIG. 12 is a reference view schematically illustrating the electron energy level of 1-Aminopyrene.

FIG. 11B shows an ultraviolet photoelectron spectroscopy (UPS) result of 1-Aminopyrene. From the energy differences, 1.04 eV and 2.1 eV (see FIG. 11C) between the Fermi energy level (−4.28 eV) obtained by a secondary electron cut-off method and the HOMO, the energy level of HOMO is defined as two energy levels, (−4.28 eV)+(−1.04 eV)=−5.32 eV, (−4.28 eV)+(−2.1 eV)=−6.38 eV, respectively, from a vacuum energy level ($E_{Vac}$=0 eV). The energy level of LUMO is defined as (−6.38 eV)+(3.97 eV)=−2.41 eV from the light absorption of 312 nm (=3.97 eV) between HOMO and LUMO. A schematic view of the electron energy level of 1-Aminopyrene from FIGS. 11B and 11C is represented as shown in FIG. 12.

Figure 13A:
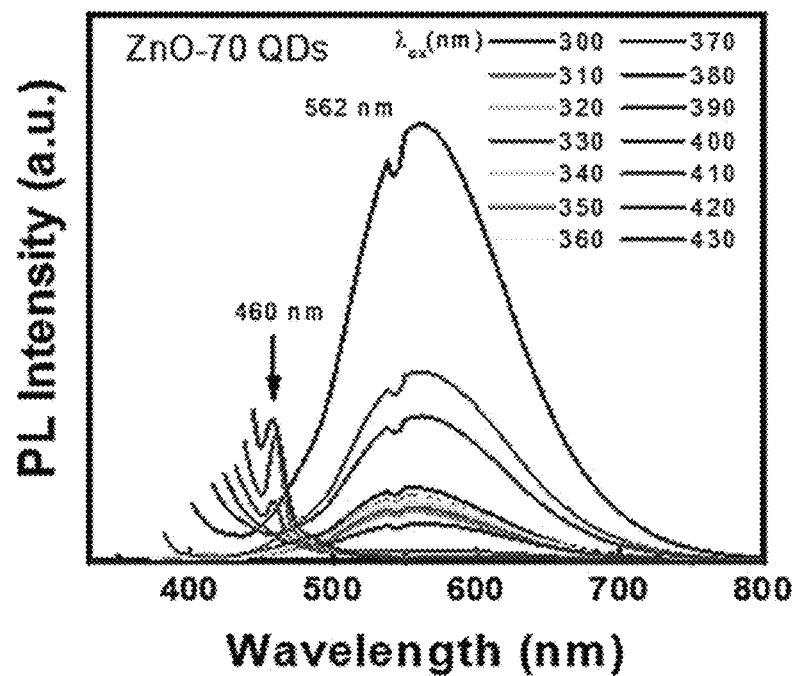
FIG. 13A shows an emission curve of ZnO-70 quantum dot.

FIG. 13A shows an emission curve of ZnO-70 quantum dot prepared according to Experimental Example 4 according to an excitation wavelength ($\lambda_{ex}$) (300 to 430 nm). As the excitation wavelength ($\lambda_{ex}$) increases from 300 nm, the yellow light emission with a center near 550 nm is observed, and the intensity of the emission curve becomes maximum at $\lambda_{ex}$=380 nm. When $\lambda_{ex}$ increases to a longer wavelength, the intensity of emission decreases gradually and the emission is observed up to 400 nm, but the emission quenches at the longer wavelength, $\lambda_{ex}$=410 to 430, and only the blue light emission centered at 460 nm is newly observed.

Figure 13B:
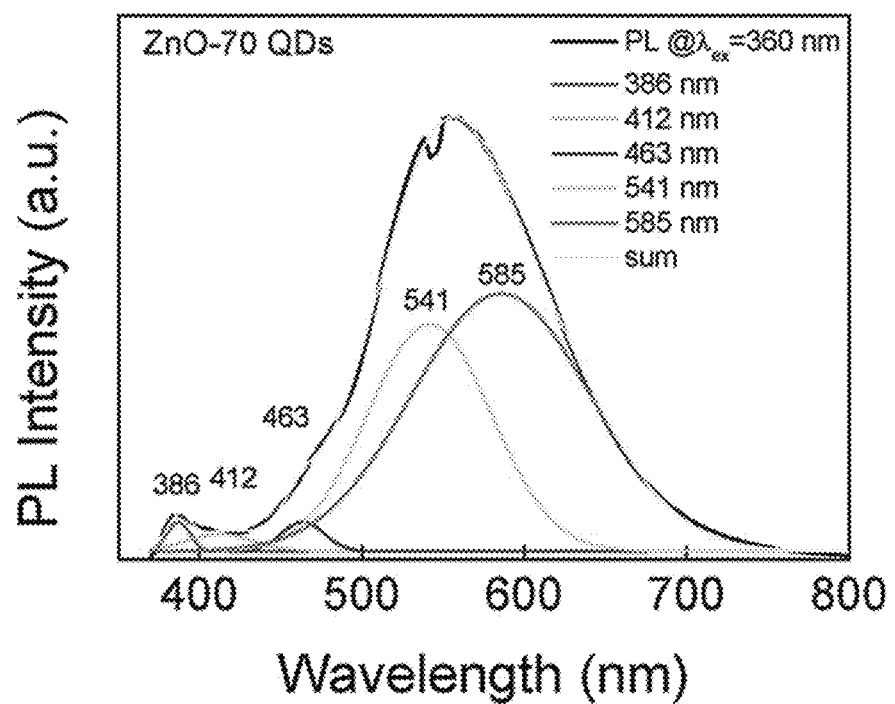
FIG. 13B shows a Gaussian fitting result of the emission curve observed at an excitation wavelength of 360 nm.

FIG. 13B shows an emission curve of ZnO-70 quantum dot measured at an excitation wavelength of 360 nm. When the sub-peaks of this emission curve are obtained using Gaussian fitting, the sub-peaks consist of near-UV at 386 nm, the violet light emission of 412 nm, the blue light emission of 463 nm, and the yellow light emission near 541 nm and 585 nm. If the energy levels of photoluminescence excitation involved in the generation of visible light emission of 463 nm, 541 nm, and 585 nm, among the emissions, are examined, the PLE curves obtained at measurement wavelengths of 465 nm, 535 nm, and 580 nm similar to these wavelengths are as shown in FIG. 14.

Figure 14:
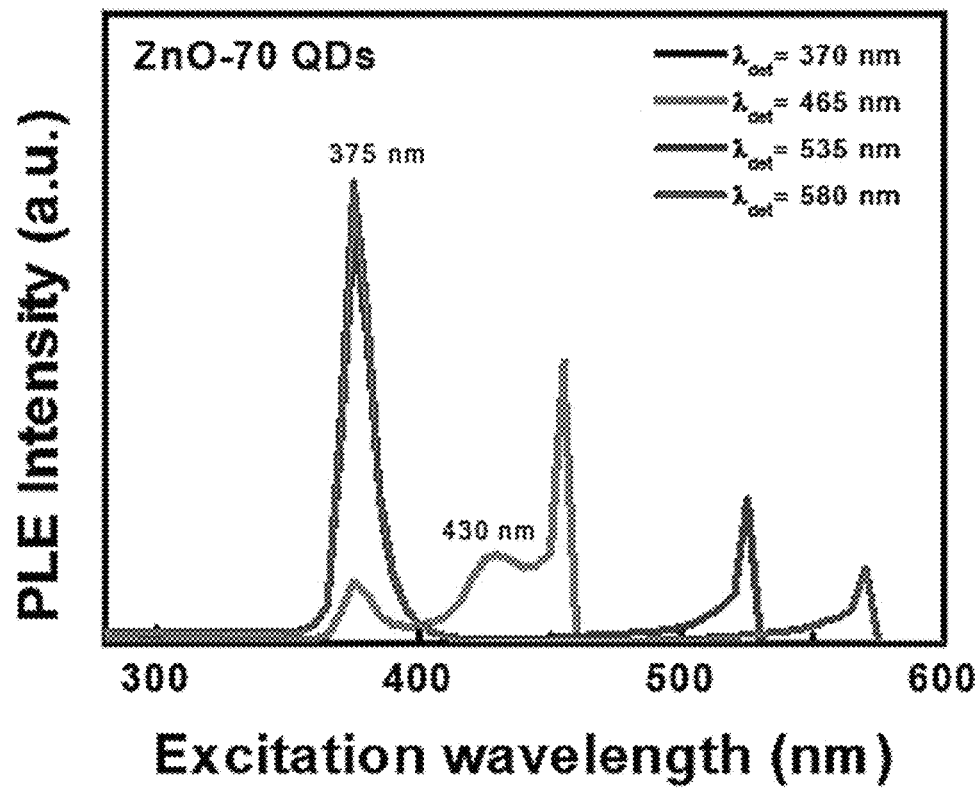
FIG. 14 shows a PLE curve of ZnO-70 quantum dot at detection wavelengths of 370 nm, 465 nm, 535 nm, and 580 nm.

As shown in FIG. 14, it can be seen that the PLE energy level of the yellow light emission of 535 nm and 580 nm is 375 nm (=3.30 eV), that is, an energy level corresponding to the conduction band (CB). On the other hand, it can be seen that the PLE energy level of the blue light emission of 465 nm contributes not only to 375 nm but also 430 nm (=2.88 eV). Therefore, the blue light emission of 460 nm (=2.69 eV) occurs when electrons transit from an energy level of 430 nm (=2.88 eV) to an energy level of 0.19 eV above the valence band (VB). The 0.19 eV above the valence band (VB) is well known as the energy level of the primary ionized Zn vacancy ($V_{Zn}^-$) defect. In contrast, in 541 nm (=2.29 eV) and 585 nm (=2.12 eV), only the conduction band (CB) of 375 nm (=3.3 eV) is the energy level related to the PLE, and the maximum emission intensity is shown at the excitation wavelength of 380 nm (=3.26 eV), and the intensity is weakened up to the excitation wavelength of 400 nm (=3.1 eV), but the yellow light emission is still observed. From the excitation wavelength of 410 nm (=3.0 eV), the yellow light emission quenches, and instead, the blue light emission of 460 nm starts to be observed, and the blue light emission of 460 nm shows a maximum value at the excitation wavelength of 430 nm. Therefore, it can be seen that the energy levels related to the yellow light emission of 541 nm (=2.29 eV) and 585 nm (=2.12 eV) are not only due to the conduction band (CB), but also due to the shallow donor energy level existing between 3.1 eV and 3.26 eV. That is, 3.26 eV−2.29 eV=0.97 eV, 3.1 eV−2.12 eV=0.98 eV, which can be explained by the visible light emission caused by the electron transition from the valence band (VB) to the energy level above 0.97 eV to 0.98 eV. 0.97 eV to 0.98 eV are known as the energy level of the secondary ionized Zn vacancy ($V_{Zn}^{2-}$) defect.

Figure 15A:
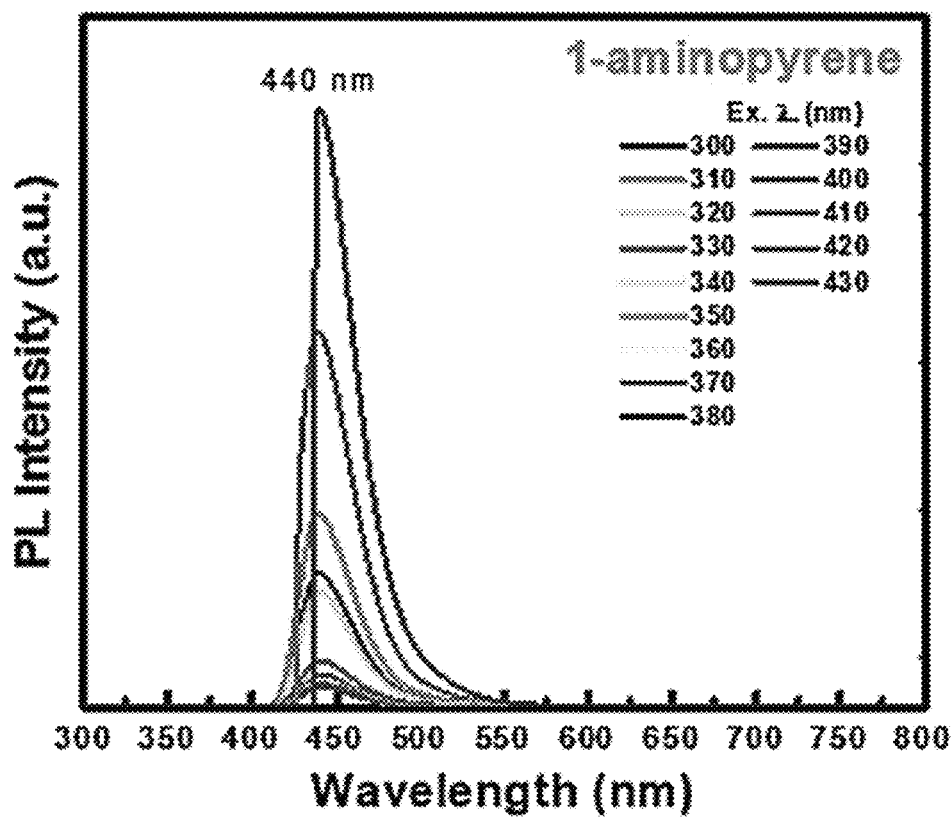
FIG. 15A shows an emission curve of 1-Amino-Pyrene.

FIG. 15A shows an emission curve of 1-Amino-Pyrene. As shown in FIG. 15A, the maximum emission intensity was observed in the order of excitation wavelengths of 430 nm, 420 nm, and 310 nm, and the blue light emission of the excitation wavelength less than the bandgap (sub-$E_g$) was observed to be dominant rather than the blue light emission of the excitation wavelength greater than bandgap (Super-$E_g$). As for the emission center, the blue light emission (440 nm) was observed as the central wavelength, and the full width at half maximum (FWHM) was observed to be about 50 to 52 nm.

Figure 15B:
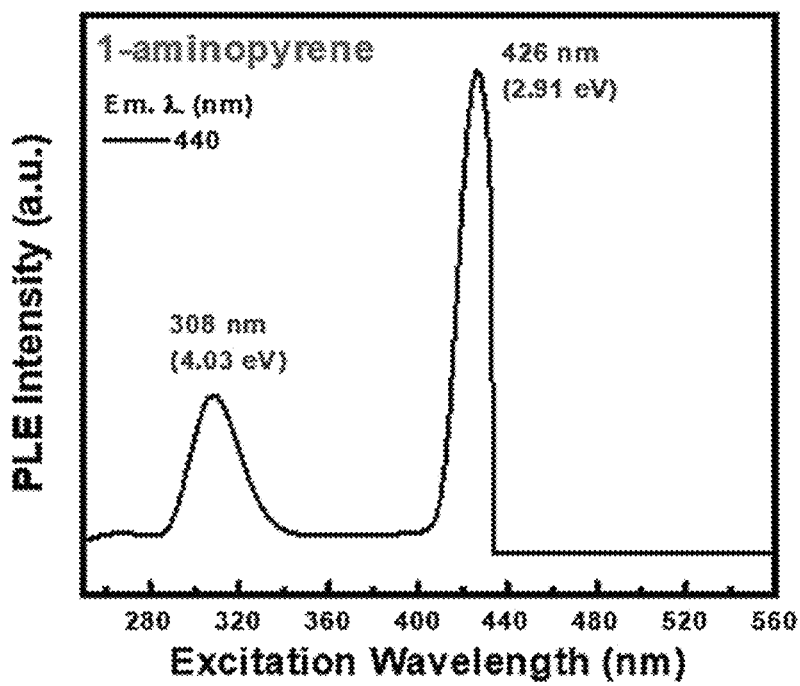
FIG. 15B shows a Gaussian fitting result for a PLE curve with a detection wavelength of 440 nm.

FIG. 15B shows a PLE curve for a detection wavelength of $\lambda_{Det}$=440 nm, and two energy levels of 308 nm (=4.03 eV) and 426 nm (=2.91 eV) contribute. As shown in FIG. 12, it is well consistent with the absorption from HOMO(C=C, π) (−6.38 eV) and the bonding orbital (−5.32 eV) of the non-bonding state to LUMO(C=C, π*) (−2.35 eV to 2.41 eV), so the blue light emission of 440 nm is well explained by the electron transition from the LUMO (−2.38 eV to −2.41 eV) to the energy level (−5.32 eV) of the bonding orbital (π) of a non-bonding state, or from the energy level (−3.47 eV) of the anti-bonding orbital (π*) of a non-bonding state to the HOMO energy level (−6.38 eV).

Figure 16:
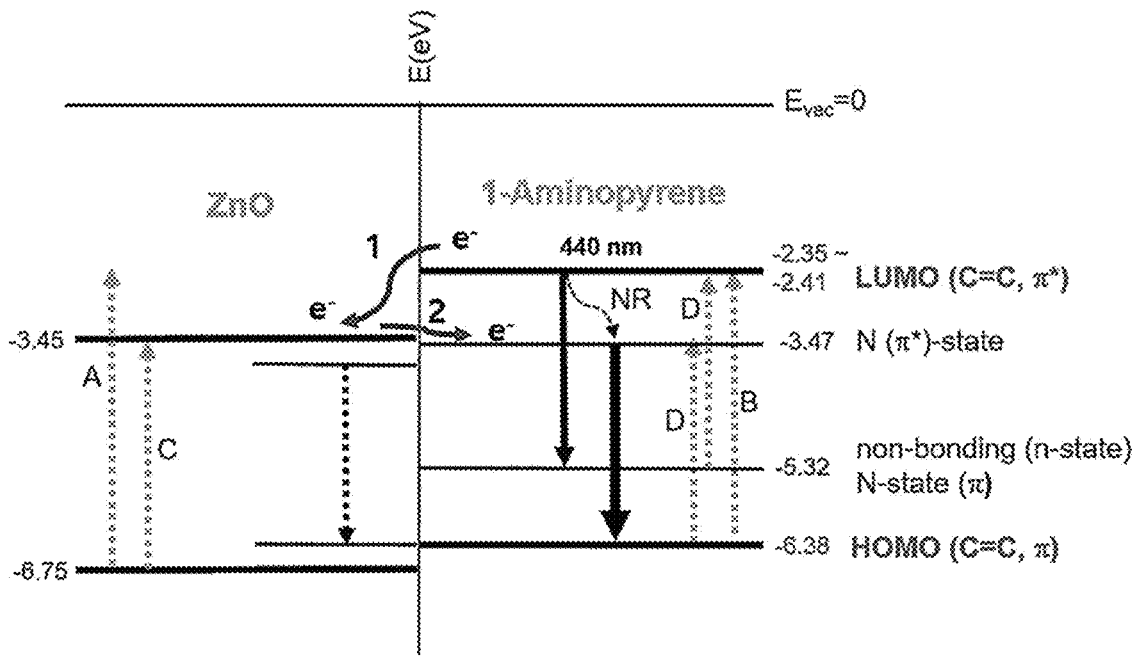
FIG. 16 is a reference view schematically illustrating the electron energy level of ZnO@ Aminopyrene quantum dot.

Therefore, the graph of the electron energy level of the ZnO@Aminopyrene quantum dot having the quasi-Type II structure as shown in FIG. 16 can be estimated from the results obtained by the above-described emission spectrum and ultraviolet photoelectric spectroscopy.

Figure 17A:
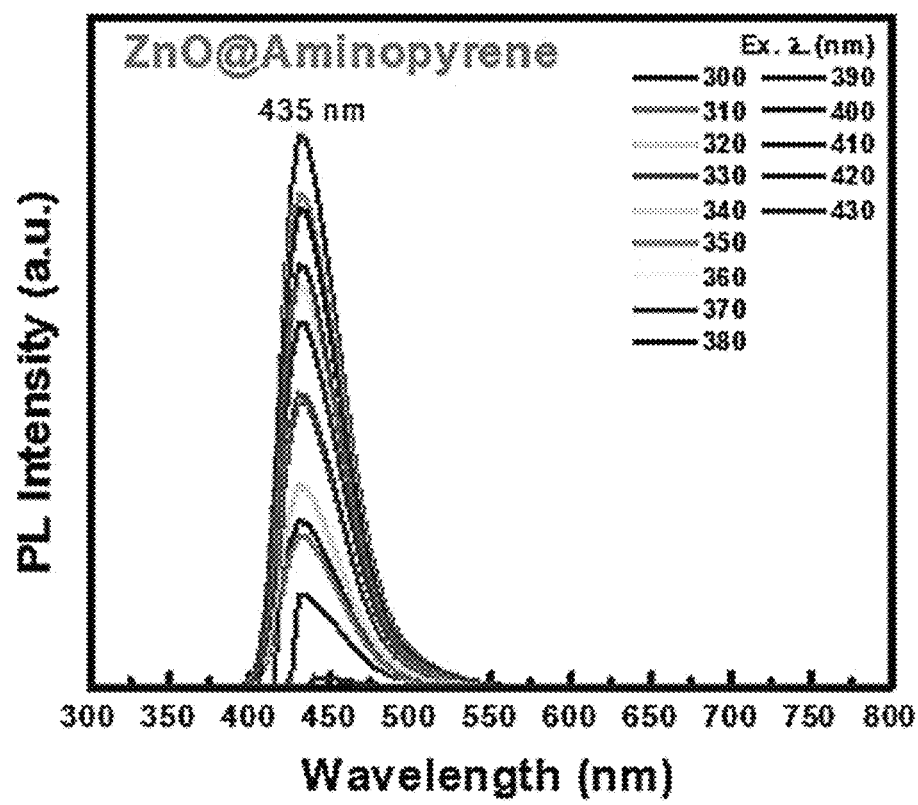
FIG. 17A shows an emission curve of ZnO@Aminopyrene quantum dot.
Figure 17B:
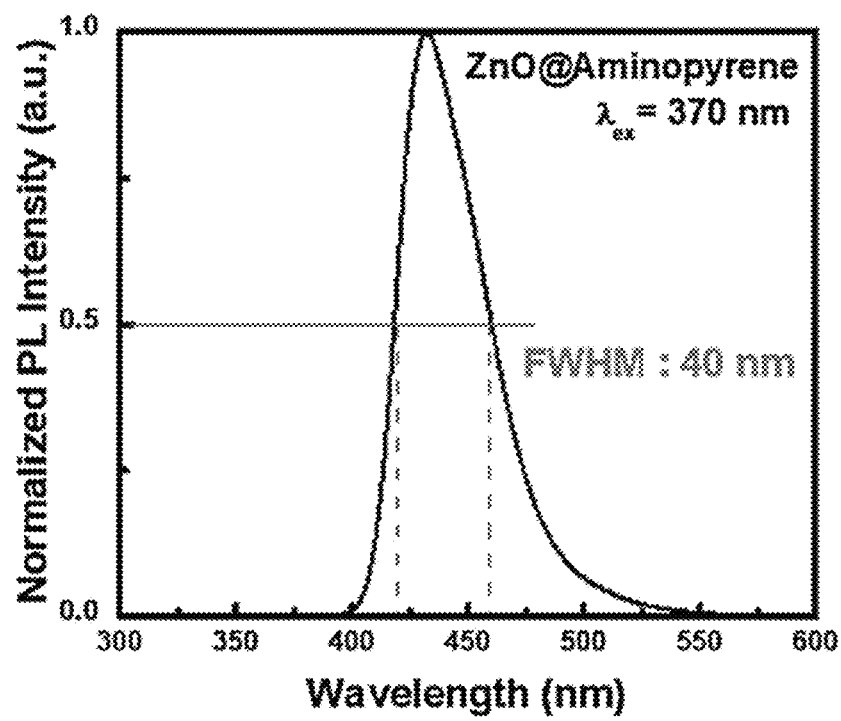
FIG. 17B shows a full-width at half maximum of an emission curve at an excitation wavelength of 370 nm.
Figure 17C:
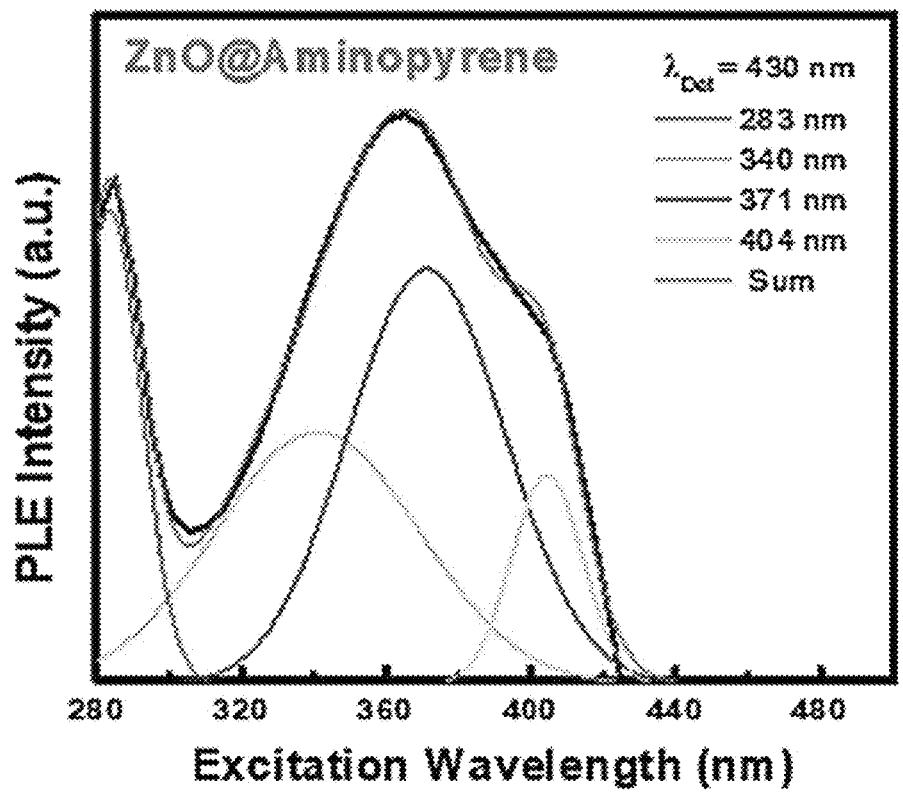
FIG. 17C shows a Gaussian fitting result of a PLE curve at a detection wavelength of 430 nm.

FIG. 17A shows an emission curve of ZnO@Aminopyrene quantum dot. As shown in FIG. 17A, the blue light emission centered at about 435 nm is observed as the excitation wavelength is increased from 300 nm, and the maximum emission intensity is shown at 360 nm while the emission intensity is also increased. After that, the emission gradually decreases and is observed well up to 420 nm, and shows almost weak intensity at the excitation wavelength of 430 nm. Referring to FIG. 17B, the full-width at half maximum (FWHM) of blue light emission (430 nm) at an excitation wavelength of 370 nm was about 40 nm, which was smaller than 50 nm to 52 nm of 1-Amino-Pyrene. FIG. 17C shows the PLE curves for the detection wavelength $\lambda_{Det}$=430 nm due to 283 nm (=4.38 eV), 340 nm (=3.64 eV), 371 nm (=3.34 eV), and 404 nm (=3.06 eV), respectively.

283 nm (=4.38 eV), 340 nm (=3.64 eV), 371 nm (=3.34 eV), and 404 nm (=3.06 eV) in FIG. 17C are consistent with the absorptions between the energy levels indicated as A, B, C, D in FIG. 16, respectively. Therefore, the blue light emission of ZnO@Aminopyrene near 435 nm is well explained by the mechanism in which the electrons photo-excited to the LUMO of 1-Aminopyrene are transferred to the conduction band (CB) of ZnO (Process 1, see FIG. 16), and accordingly, the visible light emission inside the ZnO is quenched, and charges are transferred to −3.47 eV (process 2, see FIG. 16), which is the energy level of the anti-bonding orbital of the non-bonding state, which is a similar energy level sequentially, and the transferred electrons are transited to the HOMO energy level (−6.38 eV). Therefore, it can be seen that ZnO@Aminopyrene has the quasi-Type II core-shell quantum dot structure, and light emission occurs in the aminopyrene, which is the shell.

What is claimed is:

1. A zinc oxide-polycyclic aromatic hydrocarbon quantum dot capable of blue light emission, comprising a core-shell structure of zinc oxide-polycyclic aromatic hydrocarbon (ZnO-PAH) quantum dot in which the ZnO quantum dot and the PAH are combined,
   wherein the ZnO-PAH quantum dot comprises an energy level in a form of a Type II structure or a quasi-Type II structure.

2. The zinc oxide-polycyclic aromatic hydrocarbon quantum dot according to claim 1, wherein in the Type II structure, a lowest unoccupied molecular orbital (LUMO) of the PAH has an energy level lower than the energy level of a conduction band (CB) of the ZnO, and a highest occupied molecular orbital (HOMO) of the PAH has the energy level lower than the energy level of a valence band (VB) of the ZnO,
   in the quasi-Type II structure, the LUMO of the PAH has the energy level higher than the energy level of the CB of the ZnO, and the HOMO of the PAH has the energy level higher than the energy level of the VB of the ZnO.

3. The zinc oxide-polycyclic aromatic hydrocarbon quantum dot according to claim 1, wherein the PAH is a polycyclic aromatic hydrocarbon capable of emitting blue light, the PAH has an energy bandgap ($E_g$) between a lowest unoccupied molecular orbital (LUMO) and a highest occupied molecular orbital (HOMO) of 2.5 eV or more.

4. The zinc oxide-polycyclic aromatic hydrocarbon quantum dot according to claim 1, wherein the PAH is a polycyclic aromatic hydrocarbon in which benzene rings are linearly or non-linearly connected.

5. The zinc oxide-polycyclic aromatic hydrocarbon quantum dot according to claim 4, wherein, when n is referred as a number of the linearly connected benzene rings, the PAH is any one of benzene in case of n=1, naphthalene in case of n=2, anthracene in case of n=3, tetracene, naphthacene in case of n=4, and pentacene in case of n=5, or when n is referred as a number of the non-linearly connected benzene rings, the PAH is any one of pentalene, as-indacene, s-indacene in case of n=2, biphenylene, acenaphthylene, fluorene, fluoranthracene, phenanthrene, phenalene in case of n=3, pyrene, acephenanthrylene, fluoranthene, aceanthrylene, triphenylene, benzanthracene, chrysene in case of n=4, dibenz(a,h)anthracene, picene, perylene, benzo(e)pyrene in case of n=5, corannulene in case of n=6, coronene in case of n=7, and ovalene in case of n=10.

6. The zinc oxide-polycyclic aromatic hydrocarbon quantum dot according to claim 1, wherein the PAH has a functional group, and the ZnO quantum dot and the PAH are bonded through the functional group, and the functional group is a function group comprising any one or more of O, N, P, S, and Se.

7. The zinc oxide-polycyclic aromatic hydrocarbon quantum dot according to claim 1, wherein a photo-excited electron transports from the ZnO quantum dot to the PAH when the quantum dot is irradiated with light, and electron transition occurs in the PAH to express the blue light emission.

* * * * *